United States Patent
Lopez et al.

(10) Patent No.: US 10,084,751 B2
(45) Date of Patent: *Sep. 25, 2018

(54) LOAD BALANCING AMONG A CLUSTER OF FIREWALL SECURITY DEVICES

(71) Applicant: Fortinet, Inc., Sunnyvale, CA (US)

(72) Inventors: Edward Lopez, Herndon, VA (US); Joe Mihelich, Folsom, CA (US); Matthew F. Hepburn, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,273

(22) Filed: Nov. 19, 2017

(65) Prior Publication Data

US 2018/0077118 A1  Mar. 15, 2018

Related U.S. Application Data

(63) Continuation of application No. 15/232,742, filed on Aug. 9, 2016, now Pat. No. 9,825,912, which is a
(Continued)

(51) Int. Cl.
*H04L 29/06* (2006.01)
*H04L 12/931* (2013.01)
(Continued)

(52) U.S. Cl.
CPC .... *H04L 63/0236* (2013.01); *G06F 17/30589* (2013.01); *G06F 17/30952* (2013.01);
(Continued)

(58) Field of Classification Search
CPC ... H04L 63/0236; H04L 45/74; H04L 47/125; H04L 47/196; H04L 47/726;
(Continued)

(56) References Cited

U.S. PATENT DOCUMENTS 5,506,841 A   4/1996  Sandquist
6,061,368 A   5/2000  Hitzelberger
(Continued)

OTHER PUBLICATIONS

Boukerche et al—"An Adaptive Dynamic Load Balancing for Large Scale Distributed & Virtual Simulations," 2009, IEEE, pp. 1-5.*
(Continued)

*Primary Examiner* — Luu Pham
*Assistant Examiner* — James J Wilcox
(74) *Attorney, Agent, or Firm* — Hamilton, DeSanctis & Cha LLP

(57) ABSTRACT

A method for balancing load among firewall security devices (FSDs) is provided. According to one embodiment, a switching device performs adaptive load balancing among cluster units of an HA cluster of firewall security devices. A load balancing (LB) function implemented by the switching device is configured based on information received from a network administrator. A LB table is maintained that forms associations between hash values output by the LB function and corresponding ports of the switching device to which the cluster units are coupled. Network traffic received by the switching device is directed to appropriate cluster units based on the LB function and the LB table. A traffic load on each of the cluster units is monitored. Responsive to a deviation from a predefined ideal traffic distribution, an attempt is made to improve performance of the HA cluster by dynamically adjusting the LB balancing table to address the deviation.

18 Claims, 21 Drawing Sheets

Related U.S. Application Data continuation of application No. 15/071,005, filed on Mar. 15, 2016, now Pat. No. 9,413,718, which is a continuation of application No. 14/979,031, filed on Dec. 22, 2015, now Pat. No. 9,306,907, which is a continuation of application No. 14/142,560, filed on Dec. 27, 2013, now Pat. No. 9,270,639, which is a continuation-in-part of application No. 13/356,399, filed on Jan. 23, 2012, now Pat. No. 8,776,207.

(60) Provisional application No. 61/542,120, filed on Sep. 30, 2011, provisional application No. 61/443,410, filed on Feb. 16, 2011.

(51) Int. Cl.

| | | |
|---|---|---|
| *H04L 29/08* | (2006.01) | |
| *H04L 29/12* | (2006.01) | |
| *G06F 17/30* | (2006.01) | |
| *H04L 12/911* | (2013.01) | |
| *H04L 12/801* | (2013.01) | |
| *H04L 12/803* | (2013.01) | |
| *H04L 12/741* | (2013.01) | |

(52) U.S. Cl.
CPC ............ *H04L 45/74* (2013.01); *H04L 47/125* (2013.01); *H04L 47/196* (2013.01); *H04L 47/726* (2013.01); *H04L 49/354* (2013.01); *H04L 61/2007* (2013.01); *H04L 63/02* (2013.01); *H04L 63/029* (2013.01); *H04L 63/0218* (2013.01); *H04L 63/1408* (2013.01); *H04L 63/1458* (2013.01); *H04L 67/1002* (2013.01); *H04L 67/1004* (2013.01); *H04L 67/1027* (2013.01); *H04L 67/142* (2013.01); *H04L 63/0227* (2013.01); *H04L 63/0272* (2013.01)

(58) Field of Classification Search
CPC ... H04L 49/354; H04L 61/2007; H04L 63/02; H04L 63/0218; H04L 63/029; H04L 63/1408; H04L 63/1458; H04L 67/1002; H04L 67/1004; H04L 67/1027; H04L 67/142; H04L 63/0227; H04L 63/0272; G06F 17/30589; G06F 17/30952
See application file for complete search history.

(56) References Cited

U.S. PATENT DOCUMENTS

| | | | |
|---|---|---|---|
| 6,345,041 B1 | 2/2002 | Kimball et al. | |
| 6,553,029 B1 | 4/2003 | Alexander | |
| 6,580,715 B1 | 6/2003 | Bare | |
| 6,587,431 B1 | 7/2003 | Almulhem et al. | |
| 6,601,101 B1 | 7/2003 | Lee | |
| 6,614,758 B2* | 9/2003 | Wong | H04L 47/10 370/232 |
| 6,788,692 B1 | 9/2004 | Boudreau et al. | |
| 6,856,621 B1 | 2/2005 | Artes | |
| 6,880,089 B1 | 4/2005 | Bommareddy et al. | |
| 6,973,496 B2 | 12/2005 | Hayes | |
| 7,003,574 B1 | 2/2006 | Bahl | |
| 7,180,894 B2 | 2/2007 | Guerrero | |
| 7,401,355 B2* | 7/2008 | Supnik | H04L 45/00 726/11 |
| 7,440,467 B2 | 10/2008 | Gallatin et al. | |
| 7,554,914 B1 | 6/2009 | Li et al. | |
| 7,647,427 B1 | 1/2010 | Devarapalli | |
| 7,657,940 B2 | 2/2010 | Portolani et al. | |
| 7,672,236 B1 | 3/2010 | Karunakaran et al. | |
| 7,707,295 B1 | 4/2010 | Szeto et al. | |
| 7,773,507 B1 | 8/2010 | Kasralikar et al. | |
| 7,774,470 B1 | 8/2010 | Sanders et al. | |
| 7,792,047 B2 | 9/2010 | Gallatin et al. | |
| 7,796,613 B2 | 9/2010 | Wackerly | |
| 7,843,906 B1 | 11/2010 | Chidambaram et al. | |
| 7,844,731 B1 | 11/2010 | Zhou | |
| 7,941,837 B1* | 5/2011 | Jiang | H04L 63/0236 370/352 |
| 7,958,199 B2 | 6/2011 | Ferrari et al. | |
| 7,978,598 B1 | 7/2011 | Majee | |
| 8,015,298 B2 | 9/2011 | Yevmenkin | |
| 8,112,547 B2 | 2/2012 | Corl et al. | |
| 8,176,553 B1 | 5/2012 | Magdych et al. | |
| 8,194,664 B2 | 6/2012 | Dharwadkar | |
| 8,248,928 B1* | 8/2012 | Wang | H04L 43/026 370/230 |
| 8,259,585 B1* | 9/2012 | S P | H04L 45/125 370/237 |
| 8,261,337 B1 | 9/2012 | Liu | |
| 8,488,456 B2 | 7/2013 | Battestilli et al. | |
| 8,675,655 B2 | 3/2014 | Barri et al. | |
| 8,726,008 B2 | 5/2014 | Schory et al. | |
| 8,767,754 B1 | 7/2014 | Muthuswamy et al. | |
| 8,776,207 B2 | 7/2014 | Mihelich et al. | |
| 8,789,135 B1 | 7/2014 | Pani | |
| 8,830,093 B2 | 9/2014 | Kumar et al. | |
| 8,850,002 B1 | 9/2014 | Dickinson et al. | |
| 9,027,129 B1 | 5/2015 | Kancherla | |
| 9,063,825 B1 | 6/2015 | Bao | |
| 9,237,100 B1 | 1/2016 | Mizrahi et al. | |
| 9,237,132 B2* | 1/2016 | Mihelich | H04L 63/0218 |
| 9,270,639 B2* | 2/2016 | Lopez | H04L 63/0218 |
| 9,276,907 B1 | 3/2016 | Mihelich et al. | |
| 9,288,183 B2 | 3/2016 | Lopez et al. | |
| 9,306,907 B1* | 4/2016 | Lopez | H04L 63/0218 |
| 9,344,386 B2 | 5/2016 | Muthuswamy et al. | |
| 9,413,718 B1 | 8/2016 | Lopez et al. | |
| 9,455,956 B2 | 9/2016 | Mihelich et al. | |
| 9,590,820 B1* | 3/2017 | Shukla | H04L 12/4633 |
| 9,762,402 B2* | 9/2017 | Batz | H04L 12/1407 |
| 9,825,769 B2* | 11/2017 | Batz | H04L 12/1407 |
| 9,825,912 B2* | 11/2017 | Lopez | H04L 63/0236 |
| 9,853,942 B2* | 12/2017 | Lopez | H04L 63/0236 |
| 2002/0112152 A1* | 8/2002 | VanHeyningen | H04L 9/12 713/151 |
| 2003/0018927 A1 | 1/2003 | Gadir et al. | |
| 2003/0051155 A1 | 3/2003 | Martin | |
| 2003/0081608 A1 | 5/2003 | Barri et al. | |
| 2003/0084100 A1 | 5/2003 | Gahan et al. | |
| 2003/0120788 A1 | 6/2003 | Berthaud | |
| 2003/0120816 A1 | 6/2003 | Berthaud | |
| 2003/0135625 A1 | 7/2003 | Fontes et al. | |
| 2003/0195919 A1* | 10/2003 | Watanuki | H04L 29/12462 718/105 |
| 2003/0217039 A1 | 11/2003 | Kurtz et al. | |
| 2004/0107286 A1* | 6/2004 | Larson | H04L 29/12216 709/229 |
| 2004/0153669 A1 | 11/2004 | Yang | |
| 2004/0236720 A1 | 11/2004 | Basso et al. | |
| 2005/0021751 A1 | 1/2005 | Block et al. | |
| 2005/0060535 A1* | 3/2005 | Bartas | H04L 63/02 713/154 |
| 2005/0080890 A1 | 4/2005 | Yang et al. | |
| 2005/0081058 A1 | 4/2005 | Chang et al. | |
| 2005/0090228 A1 | 4/2005 | Black | |
| 2005/0094633 A1 | 5/2005 | Varanasi | |
| 2005/0102393 A1 | 5/2005 | Murray et al. | |
| 2005/0183139 A1 | 8/2005 | Goodard | |
| 2005/0240989 A1 | 10/2005 | Kim et al. | |
| 2005/0268331 A1 | 12/2005 | Le et al. | |
| 2005/0283641 A1 | 12/2005 | Clark et al. | |
| 2006/0013212 A1 | 1/2006 | Singh et al. | |
| 2006/0037075 A1 | 2/2006 | Frattura | |
| 2006/0053485 A1 | 3/2006 | Li | |
| 2006/0072595 A1 | 4/2006 | Broberg et al. | |
| 2006/0129695 A1 | 6/2006 | Faibish et al. | |
| 2006/0137002 A1 | 6/2006 | Forrester | |
| 2006/0209688 A1* | 9/2006 | Tsuge | H04L 45/00 370/229 |
| 2006/0215684 A1 | 9/2006 | Capone | |

(56) References Cited

U.S. PATENT DOCUMENTS

| | | |
|---|---|---|
| 2006/0221831 A1* | 10/2006 | Wadekar ............. H04L 12/4013 370/235 |
| 2006/0230129 A1 | 10/2006 | Swami |
| 2006/0248371 A1 | 11/2006 | Chen et al. |
| 2007/0050846 A1 | 3/2007 | Xie et al. |
| 2007/0058632 A1* | 3/2007 | Back ........................ H04L 43/00 370/392 |
| 2007/0070916 A1 | 3/2007 | Lehane et al. |
| 2007/0071233 A1* | 3/2007 | Zak ........................ H04L 9/0643 380/28 |
| 2007/0150594 A1 | 6/2007 | Andreev et al. |
| 2007/0162968 A1 | 7/2007 | Ferreira et al. |
| 2007/0180226 A1 | 8/2007 | Schory et al. |
| 2007/0180513 A1 | 8/2007 | Raz |
| 2007/0230415 A1 | 10/2007 | Malik |
| 2007/0266426 A1 | 11/2007 | Iyengar et al. |
| 2008/0028097 A1 | 1/2008 | Makela |
| 2008/0077705 A1 | 3/2008 | Li et al. |
| 2008/0091812 A1 | 4/2008 | Lev-Ran et al. |
| 2008/0175251 A1 | 7/2008 | Oouchi et al. |
| 2008/0291826 A1 | 11/2008 | Licardie et al. |
| 2008/0301798 A1 | 12/2008 | Hao |
| 2009/0003205 A1 | 1/2009 | Tomie et al. |
| 2009/0037902 A1 | 2/2009 | Gebhart et al. |
| 2009/0193105 A1 | 7/2009 | Charny et al. |
| 2009/0204981 A1* | 8/2009 | Karino ................ G06F 11/2023 719/328 |
| 2009/0276842 A1 | 11/2009 | Yevmenkin et al. |
| 2009/0319674 A1 | 12/2009 | Yahyaoui et al. |
| 2010/0036903 A1 | 2/2010 | Ahmad et al. |
| 2010/0180334 A1 | 7/2010 | Chen et al. |
| 2010/0281168 A1 | 11/2010 | Li et al. |
| 2010/0281216 A1* | 11/2010 | Patel ...................... G06F 12/121 711/118 |
| 2010/0302940 A1 | 12/2010 | Patel et al. |
| 2010/0332664 A1 | 12/2010 | Yevmenkin et al. |
| 2011/0019676 A1 | 1/2011 | Portolani et al. |
| 2011/0026527 A1 | 2/2011 | Shao et al. |
| 2011/0066591 A1* | 3/2011 | Moyne ............. G06F 17/30486 707/610 |
| 2011/0131646 A1 | 6/2011 | Park |
| 2011/0173490 A1 | 7/2011 | Narayanaswamy et al. |
| 2011/0196977 A1 | 8/2011 | Lynch |
| 2011/0273987 A1 | 11/2011 | Schlansker et al. |
| 2012/0017061 A1* | 1/2012 | Kawaguchi ............ G06F 3/0607 711/165 |
| 2012/0039338 A1 | 2/2012 | Morimoto |
| 2012/0082163 A1 | 4/2012 | Esteve et al. |
| 2012/0134266 A1 | 5/2012 | Roitshtein et al. |
| 2012/0137059 A1* | 5/2012 | Yang ...................... G06F 3/0611 711/104 |
| 2012/0144065 A1* | 6/2012 | Parker ............... G06F 15/17362 709/241 |
| 2012/0210416 A1 | 8/2012 | Mihelich et al. |
| 2013/0174177 A1 | 7/2013 | Newton et al. |
| 2013/0201989 A1* | 8/2013 | Hu .......................... H04L 45/24 370/392 |
| 2013/0235868 A1* | 9/2013 | Owens .................... H04L 67/32 370/389 |
| 2013/0250952 A1 | 9/2013 | Feng et al. |
| 2013/0265875 A1 | 10/2013 | Dyke |
| 2013/0268646 A1* | 10/2013 | Doron ................. H04L 67/1002 709/223 |
| 2013/0311436 A1 | 11/2013 | Calvignac et al. |
| 2013/0332613 A1 | 12/2013 | Yevmenkin et al. |
| 2014/0025800 A1 | 1/2014 | Sharma |
| 2014/0068701 A1 | 3/2014 | Burchfield et al. |
| 2014/0092087 A1* | 4/2014 | Kazama .................. G06F 9/505 345/420 |
| 2014/0143854 A1* | 5/2014 | Lopez ................. H04L 63/0218 726/14 |
| 2014/0165128 A1* | 6/2014 | Auvenshine ............ H04L 63/20 726/1 |
| 2014/0173018 A1 | 6/2014 | Westphal et al. |
| 2014/0282830 A1* | 9/2014 | Davis et al. |
| 2014/0304412 A1* | 10/2014 | Prakash .............. H04L 61/1511 709/226 |
| 2014/0317684 A1 | 10/2014 | Porras et al. |
| 2014/0321462 A1 | 10/2014 | Kancherla et al. |
| 2014/0321467 A1 | 10/2014 | Wang et al. |
| 2014/0325228 A1* | 10/2014 | Roitshtein ............. H04L 47/125 713/171 |
| 2014/0325636 A1 | 10/2014 | Mihelich et al. |
| 2015/0019702 A1 | 1/2015 | Kancherla |
| 2015/0036513 A1* | 2/2015 | Bukin .................... H04L 43/12 370/250 |
| 2015/0052575 A1 | 2/2015 | Myla et al. |
| 2015/0095969 A1 | 4/2015 | Jain |
| 2015/0117445 A1 | 4/2015 | Koponen |
| 2015/0213114 A1* | 7/2015 | Bordawekar ..... G06F 17/30598 707/740 |
| 2015/0263899 A1* | 9/2015 | Tubaltsev ............... H04L 45/02 370/254 |
| 2015/0263946 A1* | 9/2015 | Tubaltsev ............. H04L 45/586 370/392 |
| 2015/0281092 A1 | 10/2015 | Benz et al. |
| 2015/0319065 A1 | 11/2015 | Lida et al. |
| 2015/0326533 A1 | 11/2015 | Lopez et al. |
| 2015/0358236 A1* | 12/2015 | Roach ................... H04L 43/065 370/235 |
| 2015/0365953 A1* | 12/2015 | Papadopoulos ... H04W 72/0406 370/329 |
| 2016/0006687 A1* | 1/2016 | Tsirkin .................. H04L 69/324 370/392 |
| 2016/0011816 A1* | 1/2016 | Aizman ................. G06F 3/0604 711/117 |
| 2016/0036838 A1 | 2/2016 | Jain et al. |
| 2016/0078065 A1* | 3/2016 | Moyne ............. G06F 17/30486 707/694 |
| 2016/0087938 A1 | 3/2016 | Mihelich et al. |
| 2016/0112325 A1 | 4/2016 | Lopez et al. |
| 2016/0164787 A1* | 6/2016 | Roach ................... H04L 47/125 370/235 |
| 2016/0182379 A1* | 6/2016 | Mehra .................. H04L 47/125 709/223 |
| 2016/0182380 A1* | 6/2016 | Mehra .................. H04L 47/125 709/226 |
| 2016/0182450 A1 | 6/2016 | Mihelich et al. |
| 2016/0212051 A1* | 7/2016 | Lopez ................. H04L 63/0218 |
| 2016/0294703 A1* | 10/2016 | Langton ................. H04L 47/20 |
| 2016/0294866 A1 | 10/2016 | Mihelich et al. |
| 2016/0315814 A1* | 10/2016 | Thirumurthi ....... H04L 67/1008 |
| 2016/0328159 A1* | 11/2016 | Coddington .......... G06F 3/0613 |
| 2016/0337223 A1* | 11/2016 | Mackay ............... H04L 43/0888 |
| 2016/0344803 A1* | 11/2016 | Batz .................... H04L 12/1407 |
| 2016/0359806 A1 | 12/2016 | Lopez et al. |
| 2016/0359808 A1* | 12/2016 | Lopez ................. H04L 63/0218 |
| 2017/0048147 A1* | 2/2017 | Vaidya ................... H04L 47/125 |
| 2017/0163532 A1* | 6/2017 | Tubaltsev ............... H04L 45/74 |
| 2017/0279877 A1* | 9/2017 | Chang .................... H04L 67/101 |
| 2017/0279881 A1* | 9/2017 | Chang .................. H04L 65/4084 |
| 2017/0280306 A1* | 9/2017 | Patel ....................... H04W 4/10 |
| 2017/0296915 A1* | 10/2017 | Stine ..................... A63F 13/358 |
| 2017/0302528 A1* | 10/2017 | Keene .................. H04L 41/0809 |
| 2018/0077118 A1* | 3/2018 | Lopez .................. G06F 17/30589 |
| 2018/0091323 A1* | 3/2018 | Haag ...................... H04L 12/12 |
| 2018/0096595 A1* | 4/2018 | Janzen ..................... G08G 1/04 |

OTHER PUBLICATIONS

Jutao et al "An Adaptive Load Balanced on Demand Routing Method," 2009, pp. 86-89.*

Non-Final Rejection for U.S. Appl. No. 13/356,399 dated Apr. 18, 2014.

Notice of Allowance for U.S. Appl. No. 13/356,399 dated May 27, 2014.

Kopparapu, "Load Balancing Servers, Firewalls, and Caches." Wiley Computer Publishing, John Wiley & Sons, Inc., 2002, ISBN 0-471-41550-2, pp. 1-223.

(56) References Cited

OTHER PUBLICATIONS

Cisco Systems, Inc. "Catalyst 6500 Series Switch and Cisco 7600 Series Router Firewall Services Module Configuration Guide." 2004, pp. 1-382.
Non-Final Rejection for U.S. Appl. No. 14/142,560 dated Oct. 29, 2014.
Final Rejection for U.S. Appl. No. 14/142,560 dated Mar. 3, 2015.
Final Rejection for U.S. Appl. No. 14/326,024 dated Jun. 8, 2015.
Non-Final Rejection for U.S. Appl. No. 14/326,024 dated Jan. 7, 2015.
Non-Final Rejection for U.S. Appl. No. 14/804,093 dated Nov. 13, 2015.
Blue Coat., "Technology Primer: VLAN Tagging." pp. 1-2, 2007.
Notice of Allowance or U.S. Appl. No. 14/326,024 dated Nov. 25, 2015.
Notice of Allowance for U.S. Appl. No. 14/947,844 dated Jan. 20, 2016.
Notice of Allowance for U.S. Appl. No. 14/804,093 dated Jan. 21, 2016.
Notice of Allowance for U.S. Appl. No. 14/142,560 dated Jan. 6, 2016.
Notice of Allowance for U.S. Appl. No. 14/979,031 dated Feb. 18, 2016.
Non-Final Rejection for U.S. Appl. No. 15/055,617 dated Apr. 8, 2016.
Notice of Allowance for U.S. Appl. No. 15/071,005 dated Jun. 17, 2016.
U.S. Appl. No. 15/178,446, filed Jun. 9, 2016.
Notice of Allowance for U.S. Appl. No. 15/232,691 dated Sep. 6, 2017.
Notice of Allowance for U.S. Appl. No. 15/055,617 dated Aug. 16, 2016.
Non-Final Rejection for U.S. Appl. No. 15/178,446 dated Oct. 12, 2016.
Notice of Allowance for U.S. Appl. No. 15/232,742 dated Aug. 25, 2017.
Non-Final Rejection for U.S. Appl. No. 15/232,742 dated Mar. 30, 2017.
Non-Final Rejection for U.S. Appl. No. 15/232,691 dated Mar. 30, 2017.

* cited by examiner

LOAD BALANCING AMONG A CLUSTER OF FIREWALL SECURITY DEVICES

CROSS-REFERENCE TO RELATED APPLICATIONS

This application is a continuation of U.S. patent application Ser. No. 15/232,742, filed on Aug. 9, 2016, which is a continuation of U.S. patent application Ser. No. 15/071,005, filed on Mar. 15, 2016, now U.S. Pat. No. 9,413,718, which is a continuation of U.S. patent application Ser. No. 14/979,031, filed on Dec. 22, 2015, now U.S. Pat. No. 9,306,907, which is a continuation of U.S. patent application Ser. No. 14/142,560, filed on Dec. 27, 2013, now U.S. Pat. No. 9,270,639, which is a continuation-in-part of U.S. patent application Ser. No. 13/356,399, filed on Jan. 23, 2012, now U.S. Pat. No. 8,776,207, which claims the benefit of U.S. Provisional Application No. 61/443,410, filed on Feb. 16, 2011 and U.S. Provisional Application No. 61/542,120, filed on Sep. 30, 2011, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2011-2016, Fortinet, Inc.

BACKGROUND

Field

Embodiments of the present invention generally relate to the field of load balancing in a computer network. In particular, various embodiments relate to a method and system for balancing load among a plurality of firewall security devices arranged in one or more clusters.

Description of the Related Art

The Internet is a medium that provides access to various information, applications, services, and provides ability to publish information, in revolutionary ways. Today, the Internet has significantly changed the way we access and use information. Millions of computers, from low processing end personal computers to high processing-end super computers are coupled to the Internet. Internet Banking, E-commerce, and E-learning are some of the high-end services that we access in our day-to-day life. In order to access such services, a user shares his personal information, such as, name, contact details, highly confidential information such as usernames, passwords, bank account number, credit card details, and the like with the service providers. Similarly, confidential information of companies such as, trade secrets, financial details, employee details, company strategies, and the like is also stored on servers that are connected to the Internet. There is a threat to such confidential data by malware, viruses, spyware, key loggers, and unauthorized access to information and so forth. This poses great danger to unwary computer users.

In order to avoid such threats, there are various solutions, such as firewalls and antivirus software that is available in the market. A firewall provides a barrier against most of these types of threats. The firewall installed at a private network prevents any unauthorized access to and from the private network. Firewalls can be implemented in both hardware and software, or a combination of both. Generally, the firewalls are employed to restrict unauthorized Internet users from accessing the private networks connected to the Internet, such as intranets. All messages that enter or leave the private network have to pass through the firewall; the firewall examines each message and blocks those that do not meet the specified security criteria.

However, the firewall can be a single point of failure. If it fails, there will be no restrictions on the viruses, spyware, key loggers, and unauthorized access and the services may get hampered badly. In order to overcome such problems, various solutions are available that provide high availability (HA) clusters of firewalls. As there are multiple firewall systems in a cluster, how the data traffic load is balanced among the multiple firewall systems becomes extremely important. There are various network switches that are available in the market, which can balance load among the multiple firewall systems. However, there is a limitation with respect to the number of firewall systems that a single network switch can handle in a cluster. Further, due to highly varying and growing traffic requirements of today's networks, which are increasingly shifting towards core, cloud, and datacenter based solutions, the processing capability of the presently used firewall systems and the load balancing arrangement is not sufficient.

Additionally, in the presently available HA cluster based load balancing systems, it is very difficult to manage asymmetric traffic flows and achieve extreme levels of session based performance. Furthermore, due to limited processing capabilities of the present load balancing systems it is very difficult to balance load among geographically distributed firewall systems.

In light of the foregoing discussion, there is a need for a method, system, and apparatus that can overcome the limitations of presently available HA cluster based load balancing systems. The method, system, and apparatus should provide effective load balancing for the increased data traffic requirements and should be capable of handling asymmetric traffic flows. Further, the method, system and apparatus for load balancing should be capable of adaptively distributing the data traffic among the significantly large number of firewall systems. Still further, the method, system, and apparatus should provide load balancing among geographically distributed firewall systems.

SUMMARY

Methods and systems are described for balancing load among firewall security devices in a network. According to one embodiment, a method of adaptive load balancing among cluster units of a high availability (HA) cluster of firewall security devices associated with a private Internet Protocol (IP) network is provided. A load balancing function implemented by a network switching device coupled to the HA cluster is configured based on information received from a network administrator indicative of (i) a number of bits to be used as an input to the load balancing function and (ii) corresponding contiguous or non-contiguous bit positions within a header of a packet. A load balancing table is maintained by the network switching device that forms associations between hash values or emulated hash values output by the load balancing function and corresponding ports of a plurality of ports of the network switching device to which the cluster units are coupled. Network traffic received by the network switching device is directed to appropriate cluster units by: (i) determining a hash value or an emulated hash value by applying the load balancing function to values associated with the bit positions of the number of bits within headers of packets of the network traffic; and (ii) identifying a port of the plurality of ports to which an appropriate cluster unit of is coupled based on the determined hash value or the determined emulated hash value and the load balancing table; and (iii) passing the network traffic to the appropriate cluster unit via the identified port. A traffic load on each of the cluster units is monitored by the network switching device. Responsive to a deviation of the monitored traffic loads from a predefined ideal traffic distribution, an attempt is made by the network switching device to improve performance of the HA cluster by dynamically adjusting the load balancing table to address the deviation.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
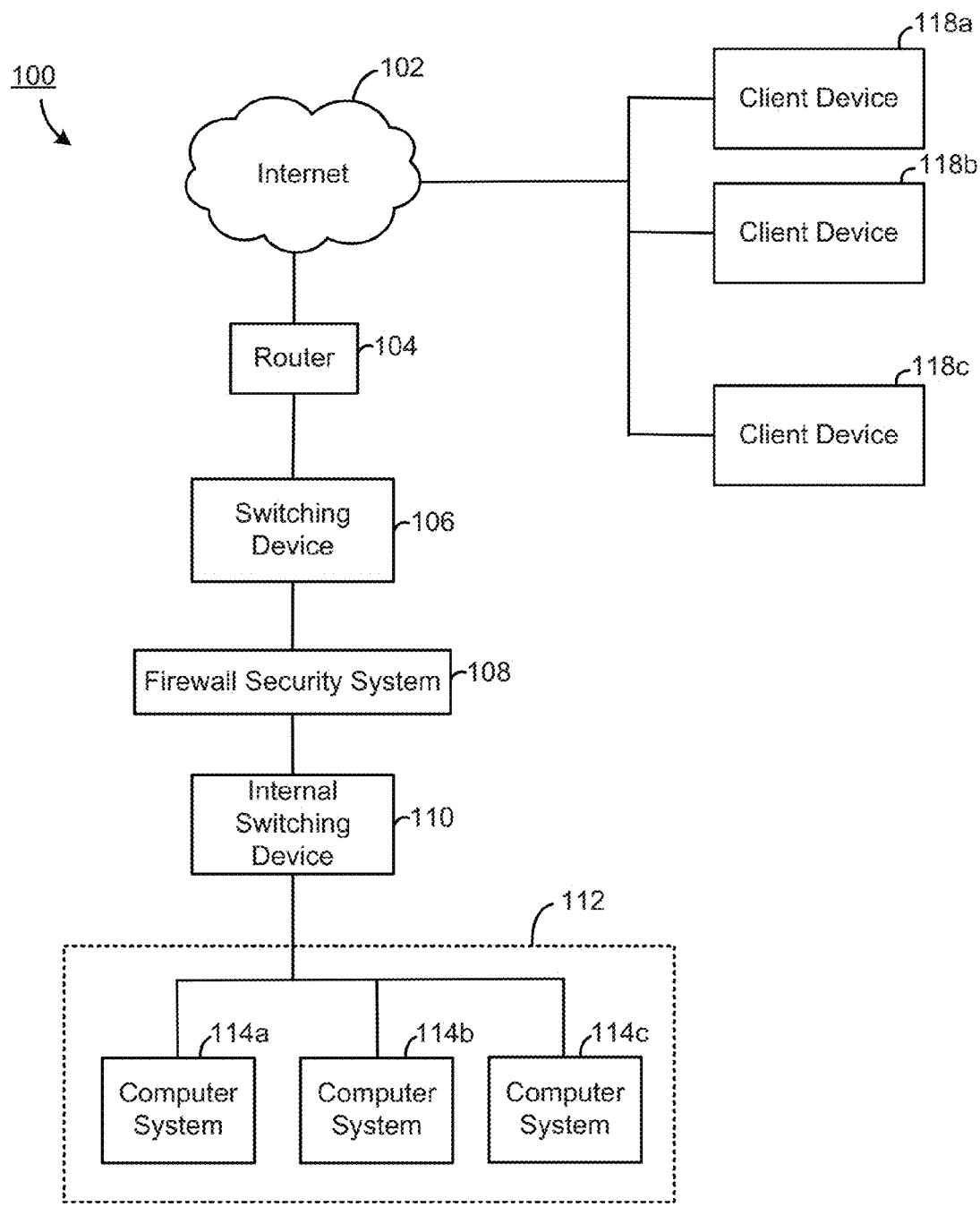
FIG. 1 is a block diagram conceptually illustrating a simplified network architecture in which embodiments of the present invention may be employed.

Methods and systems are described for balancing load among firewall security devices in a network. According to an embodiment of the present invention, firewall security devices and/or virtual systems within firewall security devices are arranged in one or more load balancing clusters. A switching device is configured to distribute traffic among the cluster members. One or more control messages are sent by the switching device to the cluster members (e.g., the firewall security devices and/or virtual systems within the firewall security devices). In response to the received control messages, the cluster members send heartbeat signals to the switching device. After the successful reception of the heartbeat signals, the cluster members are included in a load balancing table maintained by the switching device. When a data packet is subsequently received by the switching device, it is forwarded to a cluster member based on a load balancing function.

According to an embodiment of the present invention, after configuration, the switching device may keep a firewall security device in a standby mode, which can be brought into use when any firewall device in a cluster fails. Further, a load balancing function is configured in order to enable the load balancing of the received data traffic by the switching device. According to an embodiment of the present invention, the load balancing function enables the switching device to manage more than eight firewall security devices in a cluster.

According to an embodiment of the present invention, the load balancing function includes a hash function. Configuration of the load balancing function includes setting a hash bit value. Further, one or more rules are configured for generating one or more outcomes. Furthermore, one or more ports are specified corresponding to the one or more outcomes for distributing the data traffic.

According to an embodiment of the present invention, the load balancing function operates on the address information contained in the data packet. Based on the hash of one or more bits in the address field, the switching device decides, on which port to redirect the data packet. Hence, a firewall security device that is configured on the port to which the data packet is redirected, attends the data traffic.

Methods and systems, according to various embodiments of the present invention, provide high availability (HA) clusters of firewall security devices having enhanced reliability and increased performance, the two key requirements of critical enterprise networking. Load balancing in HA is implemented by configuring a plurality of firewall security devices in an HA cluster. In the network, HA clusters process network traffic and provide normal security services such as firewalling, virtual private network (VPN), virus scanning, web filtering, and spam filtering services.

According to an embodiment of the present invention, if a firewall security device in a cluster fails, another firewall security device in the cluster automatically takes over the work that the failed firewall security device was performing. Thus, the cluster continues to process network traffic and provide normal security services with virtually no interruption. Further, according to various embodiments of the present invention, methods and systems for load balancing among the plurality of firewall security devices is capable of achieving extreme levels of session-based performance. Furthermore, the various embodiments of the present invention offer the advantage of geographically distributed load-balancing, since the invention can be used to overcome a number of firewall deployment limitations, including handling asynchronous traffic.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While for sake of illustration embodiments of the present invention are described with reference to switching devices and firewall security devices available from the assignee of the present invention, it is to be understood that the methods and systems of the present invention are equally applicable to switching devices and firewall security devices that are manufactured by others, including, but not limited to, Barracuda Networks, Brocade Communications Systems, Inc., CheckPoint Software Technologies Ltd., Cisco Systems, Inc., Citrix Systems, Inc., Imperva Inc., Juniper Networks, Inc., Nokia, Palo Alto Networks, SonicWall, Inc. and Syntensia AB.

Similarly, for sake of illustration, various embodiments of the present invention are described with reference to, physical firewall security devices being members of load balancing clusters, it is to be understood that the methods and systems of the present invention are equally applicable to environments in which the firewall security devices are implemented as virtual systems in which case a physical device could have virtual systems belonging to multiple clusters.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "server" generally refers to an application, program, process or device in a client/server relationship that responds to requests for information or services by another program, process or device (a server) on a network. The term "server" also encompasses software that makes the act of serving information or providing services possible.

The term "cluster" generally refers to a group of firewall security devices that act as a single virtual firewall security device to maintain connectivity even if one of the firewall security devices in the cluster fails.

The term "cluster unit" generally refers to a firewall security device operating in a firewall security device High Availability (HA) cluster.

The term "failover" generally refers to a firewall security device taking over processing network traffic in place of another unit in the cluster that suffered a device failure or a link failure.

The term "failure" generally refers to a hardware or software problem that causes a firewall security device to stop processing network traffic.

The term "heartbeat" is also called HA heartbeat. The heartbeat constantly communicates HA status and synchronization information to make sure that the cluster is operating properly.

The term "heartbeat failover" generally refers to a mechanism in which if an interface functioning as the heartbeat device fails, the heartbeat is transferred to another interface also configured as an HA heartbeat device.

The term "High Availability" generally refers to an ability that a cluster has to maintain a connection when there is a device or link failure by having another unit in the cluster take over the connection, without any loss of connectivity. To achieve high availability, all firewall security devices in the cluster share session and configuration information.

The term "firewall security device" generally refers to a logical or physical device that provides firewall security functionality by implementing various firewall policies; however, a firewall security device is not limited to performing firewall security functionality and may perform other content processing functions, including, but not limited to scanning/processing of web (HTTP), file transfer (FTP), and email (SMTP, POP3, and IMAP), antivirus processing, intrusion prevention and hardware acceleration. In some embodiments, the firewall security devices are specialized processing blades installed within a chassis that also includes a load balancing hub blade, such as a sophisticated Ethernet switching device. In some embodiments, a physical device (e.g., a processing blade) may include multiple virtual systems that operate as firewall security devices.

The term "switching device" generally refers to a multiport bridge. For example, a switching device may be an active element working on layer 2 of the Open Systems Interconnection (OSI) model. Switching devices may use filtering/switching techniques that redirect data flow to a particular firewall security device, based on certain elements or information found in network traffic data packets. In one embodiment, a switching device distributes network traffic data packets among its ports (and associated firewall security devices) depending upon the content, elements or information associated with the packet and/or packet header, including, but not limited to a source or destination address, a source or destination port and the like. According to one embodiment, a predetermined or configurable n-bit hash value can be emulated based on a selection of n bits from one or more of the packet type, the source or destination port (e.g., TCP port), the source or destination address (e.g., IP address), or arbitrary bits associated with or in the packet and/or the packet header.

The term "load balancing table" generally refers to a data structure that contains a mapping between a hash value or emulated "hash" (e.g., one or more bits of the address contained in the data packet) and one or more ports on the switching device. The switching device uses the load balancing table for balancing data traffic load among various firewall security devices.

FIG. 1 is a block diagram conceptually illustrating a simplified network architecture 100 in which embodiments of the present invention may be employed. Network 100 includes a private or public network, such as a local area network (LAN), wide area network (WAN) or the Internet 102, a router 104, a switching device 106, a firewall security system 108, an internal switching device 110, an internal network 112, and one or more external client devices, such as, a client devices 118a-c, a client device 118b, and a client device 118c, and so forth. Further, internal network 112 includes one or more computer systems, such as, computer systems 114a-c, hereinafter referred to as the one or more computer systems 114.

Switching device 106 is connected to Internet 102 through router 104. According to one embodiment, switching device 106 is configured to perform sophisticated load balancing. For example, switching device 106 may implement a load balancing methodology that enables it to distribute network traffic among multiple firewall security devices (not shown) that have highly varying processing capabilities. In this manner, different traffic types and/or different logical or physical interface groups of the switching device 106 may be load balanced.

Firewall security system 108 is connected to switching device 106. Internal network 112 is connected to firewall security system 108 through internal switching device 110. Switching device 106 connects internal network 112 to Internet 102 through firewall security system 108 and internal switching device 110. Further, the one or more external client devices, such as, client device 118a-c, client device 118b, and client device 118b, hereinafter referred to as the one or more client devices 118, are connected to Internet 102.

One or more computer systems 114 are connected in a local area network (LAN). In another embodiment of the present invention, one or more computer systems 114 are connected in a wireless LAN (WLAN). It will be apparent to a person ordinarily skilled in the art that one or more computer systems 114 may also be connected in other network configurations without deviating from the scope of the present invention.

In an exemplary embodiment of the present invention, one or more computer systems 114 may form a part of an office or enterprise network. In another embodiment of the present invention, one or more computer systems 114 may form a part of a home network.

According to various embodiments of the present invention, one or more computer systems 114 are configured to function as client devices. In another embodiment of the present invention one or more computer systems 114 are configured to function as server computers. In yet another embodiment of the present invention, one or more computer systems 114 may comprise a combination of the client devices and server computers. Further, the server computers may be located at a datacenter, in which the datacenter is a facility where multiple computer systems and associated supporting systems, such as, telecommunications and storage systems are hosted. Further, the datacenter may include various backup power supplies, several data communication connectors, security systems and environmental controls, such as, air conditioning and fire suppression. The datacenter may occupy one room of a building, one or more floors, or may be an entire building. The one or more servers may be mounted in one or more rack cabinets.

In an embodiment of the present invention, firewall security system 108 includes a single firewall security device (not shown). In yet another embodiment of the present invention, firewall security system 108 includes more than one firewall security device, in which some subset are redundant firewall security devices. According to various embodiments of the present invention, the one or more firewall security devices in firewall security system 108 are grouped into arranged in one or more clusters (not shown). In some implementations, the firewall security devices comprise processing blades and one or more spare processing blades are installed in the system but not assigned to any particular cluster. In some embodiments, firewall security devices may be reassigned from one cluster to another cluster responsive to a change in load.

According to various embodiments of the present invention, firewall security system 108 implements firewall policies. The firewall policies are configured to protect the resources or applications hosted by one or more computer systems 114 from outsiders and to control what users of one or more client devices 118 have access to by enforcing security policies. Firewall security system 108 may filter or disallow unauthorized or potentially dangerous material or content from reaching one or more computer systems 114. Further, firewall security system 108 may limit data communication between one or more computer systems 114 and Internet 102 in accordance with local security policy established and maintained by an administrator.

In an embodiment of the present invention, firewall security system 108 may implement various techniques to control data flow. Following are the examples of such techniques:

Packet filter: firewall security system 108 may look at each packet entering or leaving the network and accept or reject it based on user-defined rules. Packet filtering is fairly effective and transparent to users, however, it is difficult to configure. In addition, it is susceptible to Internet Protocol (IP) spoofing.

Application gateway: firewall security system 108 may apply security mechanisms to specific applications, such as file transfer protocol (FTP) and Telnet servers. This is very effective, however, can impose performance degradation.

Circuit-level gateway: firewall security system 108 may apply security mechanisms when a transmission control protocol (TCP) or User Datagram Protocol (UDP) connection is established.

Proxy server: firewall security system 108 may intercept all messages entering and leaving the network. The proxy server effectively hides the true network addresses.

Firewall policies are instructions that firewall security system 108 uses to decide what to do with a connection request. When firewall security system 108 receives a connection request in the form of a packet, it analyzes the packet to extract its source address, destination address, and service (for example, by port number). Firewall security system 108 allows a packet to be connected when the source address, the destination address, and the service of the packet is consistent with a firewall policy (for example, when they match that of the firewall policy). The policy directs the firewall action on the packet. The action can be to allow the connection, deny the connection, and require authentication before the connection is allowed, or process the packet as an IPSec VPN packet.

In an exemplary embodiment of the present invention, firewall security system 108, uses one or more antivirus firewall devices, such as a FORTIGATE antivirus firewall solution provided by Fortinet, Inc. of Sunnyvale, Calif. (FORTIGATE is a trademark or registered trademark of Fortinet, Inc.).

Preferably, the antivirus firewall devices are dedicated easily managed security devices that deliver a full suite of capabilities that include: application-level services, such as virus protection and content filtering, network-level services such as firewall, intrusion detection, VPN, and traffic shaping. The above mentioned applications and services are further explained in the following description.

Antivirus protection: According to one embodiment, antivirus protection scans web (HTTP), file transfer (FTP), and email (SMTP, POP3, and IMAP) content as it passes through the antivirus firewall device. The antivirus protection may use pattern matching and/or heuristics to find viruses. If a virus is found, in one embodiment, the antivirus protection removes the file containing the virus from the content stream and forwards a replacement message to the intended recipient. For extra protection, one can configure antivirus protection to block specified file types from passing through the antivirus firewall device. This feature can be used to stop files that might contain new viruses.

Web content filtering: Web content filtering functionality may be configured to scan all or some subset of HTTP content protocol streams for URLs, URL patterns, and/or web page content. If there is a match between a URL on the URL block list, or a web page contains a word or phrase that is in the content block list, the antivirus firewall device may be configured to block the web page.

Spam filtering: Spam filtering functionality may be configured to scan all or some subset of POP3, SMTP, and IMAP email content for spam. Spam filtering can be configured to filter mail according to IP address, email address, mime headers, and content. Mail messages can be identified as spam or clear.

After basic installation of the antivirus firewall device, it allows users on the protected network to access the Internet while blocking Internet access to internal networks.

Switching device 106 connects internal network 112 to Internet 102 through firewall security system 108. In an exemplary embodiment of the present invention, switching device 106 may be a network switch. The network switch may comprise a multi-port bridge. That is, the switching device 106 may be an active element working on layer 2 of the Open Systems Interconnection (OSI) model. The network switch uses filtering/switching techniques that redirect data flow to a particular firewall security device in firewall security system 108, based on certain elements found in network traffic data packets. The network switch distributes the network traffic data packets among its ports depending upon the information, e.g., a source and a destination address contained in the network traffic data packets. The network switch is capable of determining the destination of each individual traffic data packet and selectively forwarding traffic data packet to the one security device at which the data packet is required to be sent. Once the network switch knows a destination port, it only sends the message to the right port, and the other ports are then free for other transmissions that may be taking place at the same time. Subsequently, each data exchange can run at the nominal transfer rate leading to more bandwidth sharing, without collisions, with the end result being a very significant increase in the network's bandwidth.

One or more client devices 118 are connected to switching device 106 over Internet 102. Examples of one or more client devices 118 include a desktop computer, a laptop, a notebook computer, a handheld device, such as, a mobile phone, a smart phone, a palm-top computer, Personal Digital Assistant (PDA), a navigational unit, and so forth without deviating from the scope of the invention. Further, FIG. 1 illustrates only three client devices; however, it will be apparent to a person ordinarily skilled in the art that there can be any number of client devices connected to Internet 102. One or more client devices 118 may run various applications, such as, a web browser, multiplicity of software applications, email applications, online chat applications, and so forth. Further, one or more client devices 118 may run other applications that may use Internet 102.

The applications running on one or more client devices 118, as explained above, may require accessing various services being hosted by one or more computer systems 114. In an exemplary embodiment of the present invention, a user operating client device 118 a runs a search query using the web browser application. The search query is intended to identify several images that satisfy search criteria as mentioned in the search query by the user. Router 104 connected to Internet 102 checks whether the query data packet is intended for internal network 112 by checking a destination contained in the query data packet and accordingly forwards the query data packet to switching device 106. As discussed above, switching device 106, upon receipt of such data packet, analyzes the data packet and forwards the data packet to one of the firewall security devices in firewall security system 108. Firewall security system 108 analyzes the content of the data packet to check for any harmful data. Firewall security system 108 may then forward the data packet to a computer system, such as, computer system 114 a in internal network 112, accordingly.

In response to the data packet received, computer system 114a, supplies the required image data to client 118a through internal switching device 110, firewall security system 108, and switching device 106. In this case, computer 114a may function as a server computer system. In an exemplary embodiment of the present invention, internal switching device 110 may be a network switch.

Figure 2:
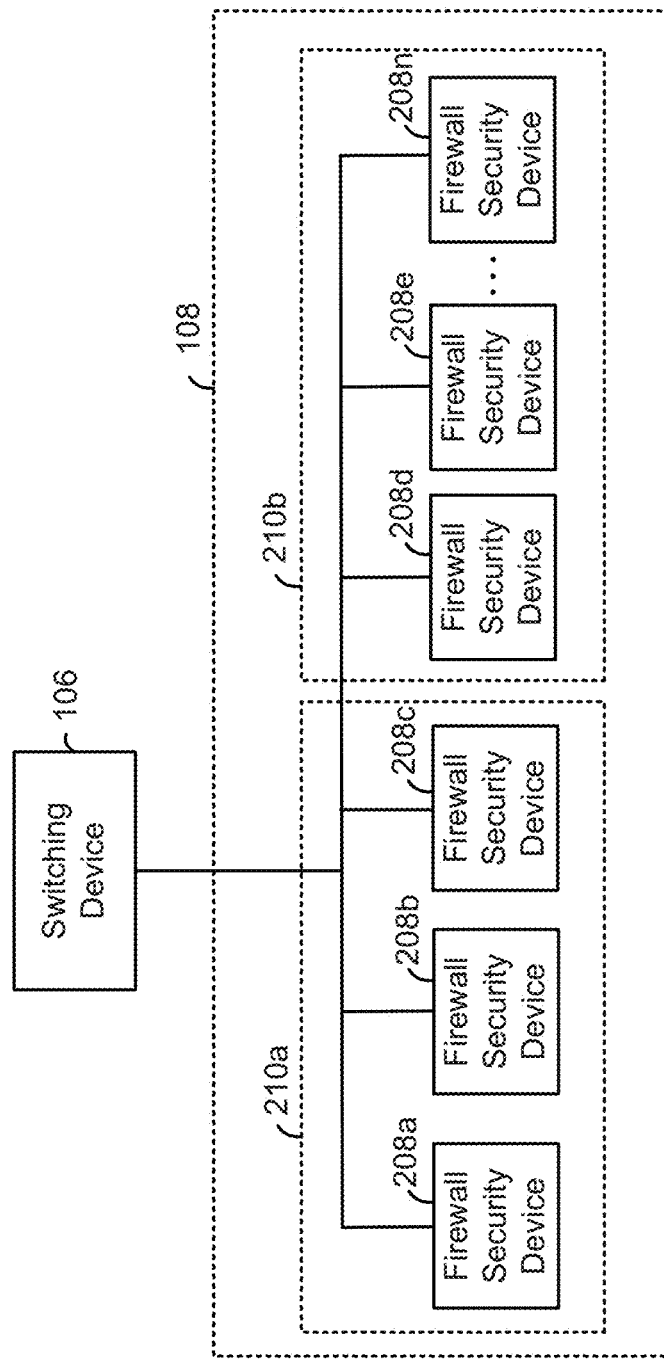
FIG. 2 is a block diagram conceptually illustrating a switching device connected to firewall security devices arranged in clusters in accordance with an embodiment of the present invention.

FIG. 2 is a block diagram conceptually illustrating a switching device connected to firewall security devices arranged in clusters in accordance with an embodiment of the present invention. Firewall security system 108 includes one or more firewall security devices such as firewall security devices 208a-n, hereinafter referred to as the one or more firewall security devices 208.

In an embodiment of the present invention, one or more firewall security devices 208 are connected to switching device 106. Firewall security system 108 includes load balancing clusters 210a and 210b. Cluster 210 a includes firewall security devices 208a-c. Further, cluster 210b includes firewall security devices 208d-n. It will be apparent to a person ordinarily skilled in the art that there can be any number of firewall security devices in one cluster. In an exemplary embodiment of the present invention, firewall security devices 208a-c in cluster 210a are employed for addressing/providing firewall security for email data traffic. Similarly, firewall security devices 208d-n in cluster 210b are employed for addressing/providing firewall security for HTTP/web data traffic.

In an embodiment of the present invention, one or more firewall security devices 208 are located at a datacenter. As discussed in conjunction with FIG. 1, the datacenter may be a facility where multiple computer systems and associated supporting systems such as telecommunications and storage systems are hosted. One or more firewall security devices 208 may be installed in one or more specialized racks such as chassis. A rack provides slots for mounting one or more firewall security devices 208. In an exemplary embodiment of the present invention, the rack may contain twelve slots for mounting one or more firewall security devices 208. In an embodiment of the present invention, switching device 106 may be mounted on the rack. Further, it will be apparent to a person ordinarily skilled in the art that switching device 106 may be mounted separately from one or more firewall security devices 208. In an exemplary embodiment of the present invention, the rack is a FORTIGATE-5140 chassis. In yet another exemplary embodiment of the present invention, the rack is a FORTIGATE-5050 chassis. In an exemplary embodiment of the present invention, firewall security device 208 a is a FORTIGATE-5001A. In another exemplary embodiment of the present invention, firewall security device 208 is a FORTIGATE-5000. In an exemplary embodiment of the present invention, switching device 106 is a FORTISWITCH-5003A (FORTISWITCH is a trademark or registered trademark of Fortinet, Inc. of Sunnyvale, Calif.). In another exemplary embodiment of the present invention, switching device 106 is a FORTISWITCH-5003.

Switching device 106 may be configured to determine which slots on the rack will be part of which cluster. For example, the one or more firewall security devices mounted in the first six slots of the twelve slots may form cluster 210a, and the remaining firewall security devices can be mounted in remaining slots to form cluster 210b. While only two clusters have been shown in FIG. 2, it will be apparent to a person having ordinary skill in the art that there can be more than two clusters without deviating from the scope of the invention. Additionally, the number of firewall security devices present in the one or more clusters, such as, cluster 210a and cluster 210b, can vary and may be more or less than three.

In an embodiment of the present invention, firewall security devices 208a and 208b are initially present in cluster 210a, and firewall security device 208c is added later to cluster 210a. According to one embodiment, when a new firewall security device, such as, firewall security device 208c is mounted in a slot which is a part of cluster 210a, switching device 106 sends one or more control messages to firewall security device 208c. The control messages are intended for configuring firewall security device 208c to enter into a load balancing mode.

In response to the reception of such control messages, firewall security device 208c synchronizes its operation with other cluster members, such as, firewall security device 208a and firewall security device 208b. In an embodiment of the present invention, firewall security device 208c exchanges multiple synchronization messages with firewall security device 208a and firewall security device 208b.

After synchronizing the operation with other cluster members, firewall security device 208c creates a virtual local area network (VLAN) device. This VLAN device is intended to represent a port on switching device 106. According to an embodiment of the present invention, firewall security device 208c creates two VLAN devices. In an embodiment of the present invention, these two interfaces may form a link aggregation group (LAG). In another embodiment of the present invention, more than two VLAN interfaces are created by firewall security device 208c. Further, these VLAN interfaces may form the LAG. LAG is defined under the link aggregation control protocol (LACP)—IEEE standard 802.3 ad, which is hereby incorporated by reference in its entirety for all purposes.

Firewall security device 208c then sends heartbeat signals to switching device 106. The heartbeat signal constantly communicates status and synchronization information from firewall security device 208c in order to ensure proper functioning. The heartbeat signal may comprise hello packets that are sent at regular intervals on a heartbeat interface of firewall security device 208c. These hello packets describe the state of firewall security device 208c and are also used by other cluster units to keep all cluster units synchronized.

According to an embodiment of the present invention, after the successful reception of heartbeat signals, switching device 106 includes the data corresponding to the newly added firewall security device 208c in a load balancing table (not shown). In another embodiment of the present invention, switching device 106 may keep firewall security device 208c in a standby mode and brings it in use when any firewall security device in cluster 210a fails. An exemplary load balancing table is further described in conjunction with FIG. 3 and FIG. 4.

Switching device 106 implements a load balancing function for balancing data traffic load between one or more firewall security devices 208. Depending upon the particular implementation and the particular networking environment, the load balancing function may be configured to address issues relating to highly varying processing capabilities in the firewall device systems and/or the differences in processing required for various forms of network traffic (e.g., depending upon the complexity and type). Further details of the load balancing function, in accordance with an embodiment of the present invention, are explained in detail in conjunction with FIG. 3. In brief, switching device 106 analyzes the data traffic received from one or more client devices 118, in order to distribute the data traffic to one or more firewall security devices 208. In an embodiment of the present invention, the load balancing function operates on the address information contained in the data packets received from one or more client devices 118. Based on the hash of one or more bits of the address field, switching device 106 decides on which port to redirect the data traffic. Thus, the firewall security device configured on the port to which the data traffic is redirected attends to and processes the data traffic.

In an embodiment of the present invention, the data packet returning from internal network 112 to one or more client devices 118 may not need to be load balanced. The data packet is sent to a port on switching device 106 whose VLAN address matches with a VLAN tag contained in the data packet.

In an embodiment of the present invention, targeted session synchronization is performed among one or more firewall security devices 208. One or more Firewall security devices 208 are capable of remembering the load balancing function as well as results of the load balancing function for which the data traffic was redirected to it. If a need arises for redirecting the transfer of the data traffic which was originally handled by firewall security device 208a to firewall security device 208c, both firewall security devices, firewall security device 208a and firewall security device 208c, will synchronize all sessions for that specific load balancing function's result. Thus, firewall security device 208c would presumably have the sessions ready for accepting the new data traffic, causing minimal session loss.

In an embodiment of the present invention, graceful start-up of a new firewall security device in a cluster may be implemented based on the targeted session synchronization functionality as discussed above. According to one embodiment, when a new firewall security device, such as firewall security device 208c, is ready to be a part of cluster 210a, after completing configuration, switching device 106 determines which firewall security device's data traffic load will be handled by the new firewall security device 208c. For example, if it is determined by switching device 106 that firewall security device 208c will take a data traffic load being handled by firewall security device 208a, then, as discussed above, targeted session synchronization is performed between firewall security device 208c and firewall security device 208a. As a result of such targeted session synchronization, sessions handled by both firewall security device 208a and firewall security device 208c get synchronized. Hence, new firewall security device 208c can be added to cluster 210a causing minimal session loss. In this manner, a mechanism is provided which allows real-time traffic redistribution as a result of an in service addition of one or more processing blades, for example, with minimal disruption.

In another embodiment of the present invention, graceful shutdown of an existing firewall security device in a cluster may be implemented based on the targeted session synchronization functionality as discussed above. When a firewall security device, such as, firewall security device 208a, is about to shutdown, it indicates that to switching device 106. For example, firewall security device 208a sends a shutdown indication message to switching device 106 before shutdown. Switching device 106 then determines a firewall security device that can take the data traffic being handled by firewall security device 208a. For example, switching device 106 determines that firewall security device 208c can take the data traffic being handled by firewall security device 208a, then, as discussed above, the targeted session synchronization is performed between them. As a result of such targeted session synchronization, sessions handled by both firewall security device 208a and firewall security device 208c get synchronized and the load balancing table will be updated accordingly. Subsequently, firewall security device 208a can shutdown without causing significant traffic loss.

Various embodiments of the present invention provide high availability (HA) clusters of firewall security devices for load balancing in a network. An HA cluster provides enhanced reliability and increased performance, the two key requirements of critical enterprise networking. Load balancing in HA is implemented by configuring a plurality of firewall security devices in an HA cluster. In the network, HA clusters process network traffic and provide normal security services such as firewalling, VPN, IPS, virus scanning, web filtering, and spam filtering services.

Further, if one cluster unit fails, such as firewall security device 208a, another unit, such as firewall security device 208c in cluster 210a, automatically replaces firewall security device 208a, taking over the work that firewall security device 208a was performing. After the failure, the cluster continues to process network traffic and provide normal firewall security services with virtually no interruption.

One or more firewall security devices 208 can operate in active-passive HA or active-active HA mode. Active-passive HA mode provides failover protection. Active-active HA mode provides load balancing as well as failover protection. These are further explained in the following description.

In an embodiment of the present invention, cluster 210a may function in active-passive HA mode. The active-passive HA cluster provides hot standby failover protection. The active-passive HA cluster 210*a* consists of a primary unit that processes traffic and one or more subordinate units that do not process traffic. In an embodiment of the present invention, firewall security device 208*a* may function as the primary unit and firewall security device 208*b* and firewall security device 208*c* may function as subordinate units. The subordinate units run in a standby state. In the standby state, the subordinate units receive cluster state information from the primary unit. Cluster state information includes a list of all communication sessions being processed by the primary unit. The subordinate units use this information to resume processing network traffic if the primary unit fails. Active-passive HA can be used for a more resilient session failover environment than active-active HA. In active-passive HA, session failover occurs for all traffic except for virus scanned sessions that are in progress.

In an embodiment of the present invention, cluster 210*a* may function in active-active HA mode. In this mode, network traffic is load balanced among all cluster units, such as firewall security device 208*a*, firewall security device 208*b*, and firewall security device 208*c*. The active-active HA cluster 210*a* consists of a primary unit that processes traffic and one or more subordinate units that also process traffic. In an embodiment of the present invention, firewall security device 208*a* may act as the primary unit and firewall security device 208*b* and firewall security device 208*c* may function as subordinate units.

In an embodiment of the present invention, the primary unit receives all network traffic. All user datagram protocol (UDP), Internet control message protocol (ICMP), multicast, and broadcast traffic is processed by the primary unit. The primary unit load balances virus scanning traffic, or optionally all TCP traffic and virus scanning traffic, among all cluster units. By distributing TCP and virus scanning among multiple cluster units, an active-active cluster may have higher throughput than a standalone firewall security device 208*a* or than an active-passive cluster. In addition to load balancing, active-active HA also provides device and link failover protection similar to an active-passive cluster. If the primary unit fails, a subordinate unit becomes the primary unit and redistributes TCP communication sessions among all remaining cluster units. UDP, ICMP, multicast and broadcast sessions and virus scanned sessions that are in progress are not failed over and must be restarted. Since, UDP, ICMP, multicast, and broadcast traffic are not failed over, active-active HA is a less robust failover solution than active-passive HA. If a subordinate unit fails, the primary unit redistributes all TCP communication sessions among the remaining cluster units. Virus scanned sessions that are in progress on the subordinate unit are not failed over and must be restarted. UDP, ICMP, multicast, and broadcast sessions being processed by the primary unit are not affected.

According to one embodiment, to facilitate seamless failover, cluster members may buffer data transfers to external storage (e.g., shared RAM or external disk) that can be accessed by all the cluster members.

In one embodiment, the load balancer (e.g., switching device 106) could have load balancing sessions. Incoming traffic may be checked against these sessions, and if the traffic matches a session it is forwarded to the port in the session, and potentially VLAN tagged. If there is a session match, the load balancing hashing function need not be reached/used. If there was no session match, the traffic can be handled by the load balancing hash function as described further below.

Such load balancing sessions can be created/destroyed/updated in several ways, including, but not limited to:
  inspection of the header data of traffic by the load balancing device, creating/deleting sessions based on traffic exiting the cluster of firewall security systems, so that return traffic will be directed to the switch that is processing the original traffic.
  explicitly creating/deleting/updating the sessions based on creation/deletion/update commands sent from the firewall security systems, or other load balancing devices, to the load balancing device.
  synchronization of the sessions from another load balancing device.

According to one embodiment, using the load balancing sessions feature, the graceful shutdown, and startup of blades can be enhanced, by changing the hashing function immediately but keeping the existing sessions in place. In this manner, new traffic will be sent to the new "owner" of the hash result, but existing sessions will still go to the old "owner". To further enhance graceful shutdown, the load balancing switch could prevent the blade shutting down from completing shutdown until all of the sessions related to it have be destroyed or expired. The adaptive load balancing would work similarly to graceful startup/shutdown. With the hash results being swapped immediately, but existing sessions would remain.

In one embodiment, using the session based system traffic that arrives on a firewall blade that cannot be handled by that blade can be redirected to a blade (or cluster), that can handle the traffic, and the firewall blade can send a command to the load balancing switch to create a session redirecting all traffic to the blade (or cluster), that can handle the traffic. For example, assuming two clusters, a load balanced cluster and a cluster of firewall blades in HA that are being used to handle IPSec tunnels. If an IPSec packet is erroneously sent to the load balanced cluster, the load balanced cluster could encapsulate the traffic in a VLAN (or other protocol) and redirect it to the IPSec cluster, while also commanding the load balancing switch to install a session redirecting that particular IPSec session to the IPSec cluster.

In one embodiment, the load balancing switch can be used in a management gateway to the firewall blades. For example, the base channel network may be used as the management network, and the switch provides direct access to the network, as well as Network Address Translated (NAT'ed) access to the network via a shared IP address on switch's management interfaces.

In one embodiment, the router 104 (or other network hardware) before the switching device 106 can mark (e.g., set a bit pattern in the header of) certain traffic, so that the switching device can use that mark to redirect packets to different hashing algorithms or different clusters or firewall units.

Figure 3:
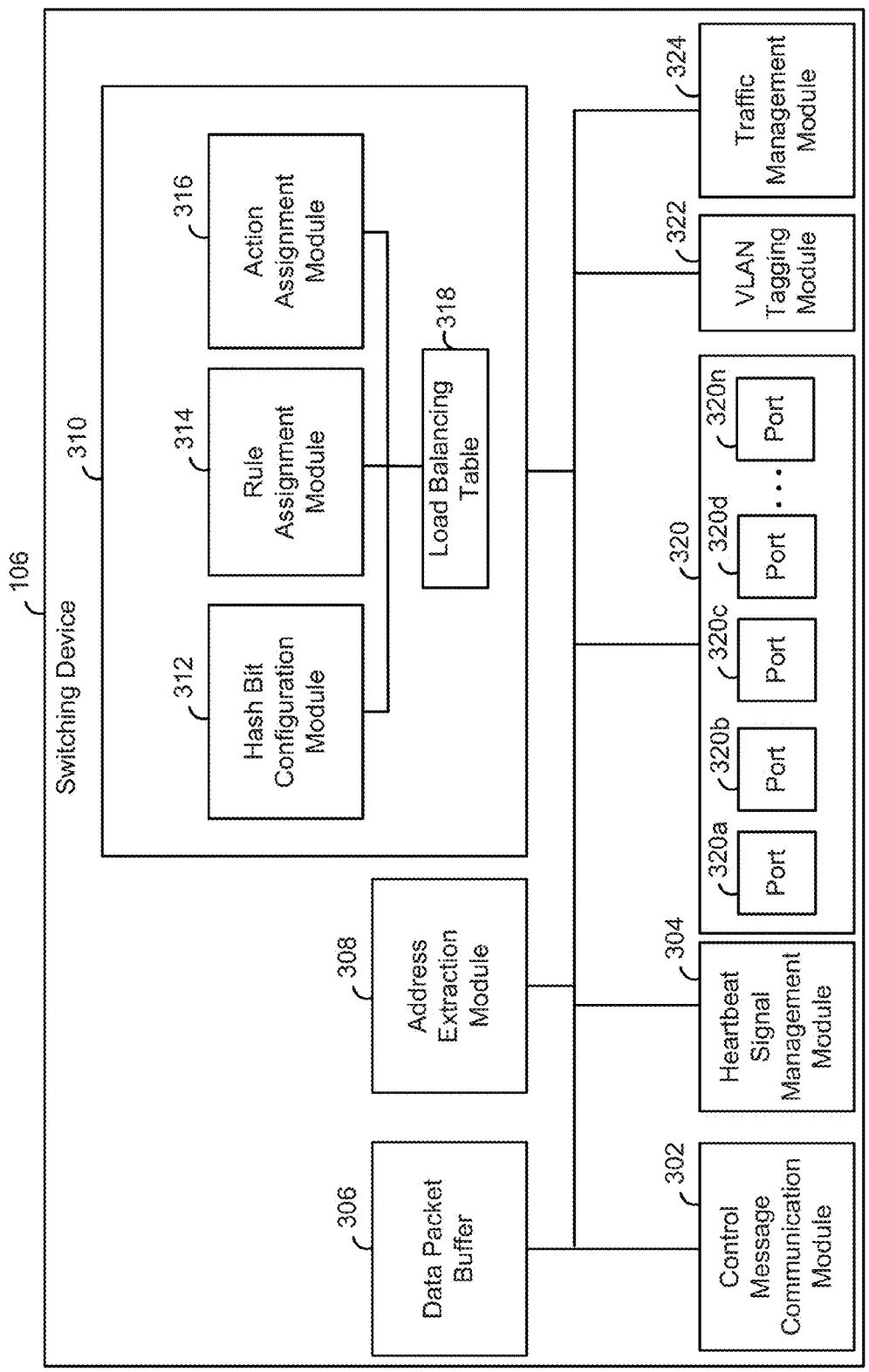
FIG. 3 is a block diagram conceptually illustrating interaction among various functional units of a switching device in accordance with an embodiment of the present invention.

FIG. 3 is a block diagram conceptually illustrating interaction among various functional units of a switching device 106 in accordance with an embodiment of the present invention. Switching device 106 includes a control message communication module 302, a heartbeat signal management module 304, a data packet buffer 306, an address extraction module 308, a load balancing module 310, one or more ports 320, a VLAN tagging module 322, and a traffic management module 324. Load balancing module 310 further includes a hash bit configuration module 312, a rule assignment module 314, an action assignment module 316, and a load balancing table 318. One or more ports 320 include ports, such as, port 320*a*, port 320*b*, port 320*c*, port 320*d*, and port 320*n*.

According to one embodiment, control message communication module 302 initiates the load balancing configuration of a newly installed firewall security device such as, firewall security device 208c when it is mounted on a rack (chassis). Control message communication module 302 sends one or more control messages to firewall security device 208c in order to configure firewall security device 208c for load balancing in a cluster, such as cluster 210a. Further, as discussed with reference to FIG. 2, after synchronizing the operation with other cluster members, firewall security device 208c creates a VLAN device that corresponds to a port, such as port 320c of the one or more ports 320. Further, in another embodiment of the present invention, two VLAN devices may be created by firewall security device 208c, which may represent a pair of ports from the one or more ports 320. In an embodiment of the present invention, these two interfaces may form a link aggregation group (LAG). In another embodiment of the present invention, more than two VLAN interfaces are created by firewall security device 208c. Further, these VLAN interfaces may form the LAG. After the creation of VLAN devices by firewall security device 208c, VLAN tagging module 322 assigns corresponding VLAN identifiers (IDs) to one or more ports 320.

Further, as discussed in conjunction with FIG. 2, after creation of the VLAN devices, heartbeat signal management module 304 receives heartbeat signals from firewall security device 208c. Thus, based on such successful reception of the heartbeat signals from firewall security device 208c, load balancing table 318 gets updated by including information of newly configured firewall security device 208c.

Load balancing module 310 configures a load balancing function, in order to distribute data packets received by data packet buffer 306. In an embodiment of the present invention, the load balancing function is a hash function or an emulated hash.

Hash bit configuration module 312 enables an administrator of the network to configure the hash bit value (e.g., the number of bits of information from or otherwise associated with a packet and/or a packet header to be used in connection with the "hash"). In an embodiment of the present invention, the hash bit value is five. In an embodiment of the present invention, hash bit configuration module 312 also allows the administrator to choose one or more bits of an address field for hashing. In another embodiment of the present invention, hash bit configuration module 312 also allows the administrator to choose at least one of a source address or destination address for hashing. In yet another embodiment of the present invention, hash bit configuration module 312 allows the administrator to choose one or more arbitrary bits from the data packet for hashing.

Rule assignment module 314 enables the administrator of the network to configure a rule for generating one or more outcomes. In an exemplary embodiment of the present invention, the rule is $$f(x) = D_{N-1}*2^{N-1} + \ldots + D_2*2^2 + D_1*2^1 + D_0*2^0;$$

Where N=value of hash bit.

It will be apparent to the person ordinarily skilled in the art that rule assignment module 314 enables the administrator of the network to configure different types of rules without deviating from the scope of the invention.

In an exemplary embodiment of the present invention, a predetermined number, N, of bits of the destination address $(D_X, D_{X-1}, D_{X-2}, \ldots, D_{X-(N-1)})$ are selected by the administrator for the purpose of emulating a hash. Based on the N bits, $2^N$ outcomes can be obtained and a rule can be assigned to each to determine whether to perform a particular action, e.g., redirecting the traffic to a particular port of the switching device. According to one embodiment, a 32-value hash may be emulated by picking the initial five bits from the destination address $(D_4, D_3, D_2, D_1, D_0)$. Notably, the bits need not be adjacent or consecutive. Further, it will be apparent to a person ordinarily skilled in the art that any combination of bits can be selected by the administrator without limiting the scope of the invention and without deviating from the scope of the invention. For example, the hash could be based on other values associated with or in the packet or combinations of values associated with or in the packet and/or packet header, including, but not limited to the packet type, the source or destination port (e.g., TCP port), the source or destination address (e.g., IP address), the protocol, the type of service or arbitrary bits in the packet.

According to one embodiment, the hash function is dynamically adjusted to match the actual traffic. A feedback loop may be provided based on observed traffic load of each cluster member. For example, the switching device 106 (e.g., an external switching device or a management blade of a chassis-based system) may monitor the traffic load of each cluster member and compare it to an ideal distribution and the hash function may be dynamically adjusted to improve overall system performance.

Notably, in an environment in which a physical device may have multiple virtual firewall security devices, the feedback mechanism described would take into consideration that a physical device could have a virtual system belonging to multiple clusters, and a switch employing a balancing algorithm would consider the load on the system as a whole.

Action assignment module 316 assigns an action to each of the generated outcomes. In an embodiment of the present invention, the action specifies a port of one or more ports 320 for each outcome. In an embodiment of the present invention, each outcome is assigned a port from one or more ports 320. Also, action assignment module 316 updates load balancing table 318 after the allocation of ports for all outcomes. Thus, load balancing table 318 includes information corresponding to mapping between one or more ports 320 on switching device 106 and one or more bits of addresses contained in the data packet received from one or more client devices 118. Further, one or more ports 320 are connected to corresponding firewall security devices 208. Load balancing table 318 is further described conjunction with FIG. 4.

Data packet buffer 306 receives a data packet being sent by one or more client devices such as one or more client devices 118. The data packet may represent a request for accessing information from one or more computer systems, such as one or more computer systems 114 form an internal network, for example internal network 112. Further, data packet buffer 306 forwards the received data packet to address extraction module 308. Various examples of the data packet type are IPv4, IPv6, non-IP (e.g., media access control (MAC) for layer 2 (L2) traffic) and so forth. It will be apparent to a person ordinarily skilled in the art that the invention is not limited with respect to the type of data packet, and that other types of data packets may be received by data packet buffer 306 without deviating from the scope of the invention.

Figure 17:
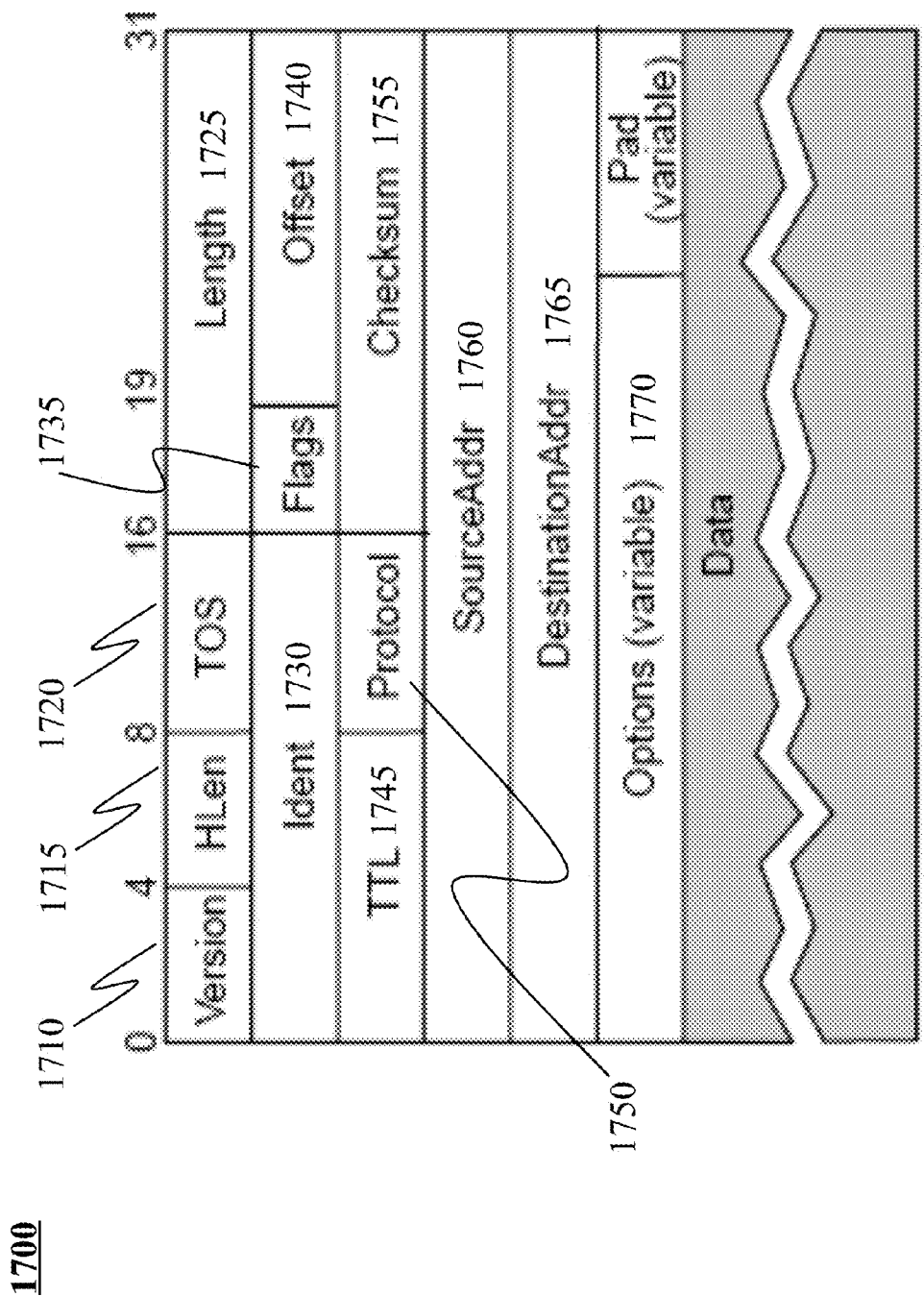
FIG. 17 illustrates a format of an Internet Protocol (IP) version 4 (IPv4) data packet 1700.

FIG. 17 illustrates a format of an Internet Protocol (IP) version 4 (IPv4) data packet 1700. Following is the description of each field in IPv4 data packet 1700.

Version 1710 (always set to the value 4 in the current version of IP)

IP Header Length (HLen) 1715 (number of 32-bit words forming the header, usually five)

Type of Service (ToS) 1720, now known as Differentiated Services Code Point (DSCP) (usually set to 0, but may indicate particular Quality of Service needs from the network, the DSCP defines the way routers should queue packets while they are waiting to be forwarded).

Size of Datagram 1725 (in bytes, this is the combined length of the header and the data)

Identification 1730 (16-bit number which together with the source address uniquely identifies this packet—used during reassembly of fragmented datagrams)

Flags 1735 (a sequence of three flags (one of the 4 bits is unused) used to control whether routers are allowed to fragment a packet (i.e. the Don't Fragment, DF, flag), and to indicate the parts of a packet to the receiver)

Fragmentation Offset 1740 (a byte count from the start of the original sent packet, set by any router which performs IP router fragmentation)

Time To Live (TTL) 1745 (Number of hops/links which the packet may be routed over, decremented by most routers—used to prevent accidental routing loops)

Protocol 1750 (Service Access Point (SAP) which indicates the type of transport packet being carried (e.g. 1=ICMP; 2=IGMP; 6=TCP; 17=UDP).

Header Checksum 1755 (A 1's complement checksum inserted by the sender and updated whenever the packet header is modified by a router—Used to detect processing errors introduced into the packet inside a router or bridge where the packet is not protected by a link layer cyclic redundancy check. Packets with an invalid checksum are discarded by all nodes in an IP network)

Source Address 1760 (the IP address of the original sender of the packet)

Destination Address 1765 (the IP address of the final destination of the packet)

Options 1770 (not normally used, but, when used, the IP header length 1715 will be greater than five 32-bit words to indicate the size of the options field 1770)

Address extraction module 308 works in conjunction with load balancing module 310. Address extraction module 308 extracts address information based on the configuration setting done by the administrator as discussed above. For example, if the administrator has configured a hash bit value as five and elected to perform load balancing based on the destination address, such as the destination address as shown in the IPv4 data packet, then address extraction module 308 extracts five bits from the destination address. In an embodiment of the present invention, address extraction module 308 extracts from the data packet the configured hash bits whether they are part of a source or destination address or otherwise as chosen by the administrator. The extracted information is then forwarded to load balancing module 310.

Load balancing module 310 uses the extracted hash bits (e.g., the five bits of the destination address) to look up the corresponding port information in load balancing table 318. The data packet is then redirected to the corresponding port of one or more ports 320. Subsequently, security checking for the data packet is handled by an associated firewall security device. According to one embodiment, the load balancing table 318 is implemented as a content addressable memory (CAM). For example, load balancing table 318 may comprise one or more ternary CAMs (TCAMs). Those skilled in the art will recognize various other possible implementations for the load balancing table 318. For example, in alternative embodiments, the load balancing table 318 may be a data structure in volatile or non-volatile storage, including, but not limited to, RAM or flash memory associated with or otherwise accessible to load balancing module 310.

In an embodiment of the present invention, traffic management module 324, monitors the amount of data traffic load being handled by each of one or more firewall security devices 208. Further, traffic management module 324 receives the information about the data traffic load on each of one or more firewall security devices 208 from each of one or more firewall security devices 208. According to one embodiment, the traffic distribution function may be changed on the fly to allow real-time traffic redistribution responsive to observed data traffic loads as described further below.

According to one embodiment, traffic management module 324 updates load balancing table 318 based on the data traffic load being handled by each of one or more firewall security devices 208. Hence, traffic management module 324 enables adaptive load balancing among one or more firewall security devices 208. For example, based on the targeted session synchronization functionality, as discussed in conjunction with FIG. 2, the data traffic load can be balanced on the fly. Hence, for each outcome, on each port, traffic management module 324 calculates the amount of data traffic being handled. If it is identified by traffic management module 324 that firewall security device 208*a* is overloaded compared to firewall security device 208*c* it would look for a cluster member with a hash result with less data traffic load that could be swapped with the hash result that is overloading firewall security device 208*a*. Ideally, the swapping of these two hash results would make the amount of load experienced by firewall security device 208*a* and firewall security device 208*c* relatively equal. In some cases, multiple hash results can be swapped. For example, a hash result from one firewall security device can be moved and added to another without swapping back to the overloaded firewall security device. Once it is determined which hash results will be swapped among the firewall security devices, targeted session synchronization can be established for each hash result to be swapped. Once the synchronization is established, the data traffic load could be re-balanced without major data traffic interruptions.

In an embodiment of the present invention, traffic management module 324 handles graceful start-up for a new firewall security device, such as firewall security device 208*c*, which is ready to be a part of cluster 210*a*. After completing the configuration, traffic management module 324 determines which firewall security device's load will be handled by the new firewall security device. For example, if it is determined by traffic management module 324 that firewall security device 208*c* will take all or a portion of the data traffic load being handled by firewall security device 208*a*, the targeted session synchronization is performed between them. As a result of such targeted session synchronization, appropriate sessions handled by both firewall security device 208*a* and firewall security device 208*c* get synchronized. Hence, the new firewall security device 208*c* can be added to cluster 210*a* causing minimal session loss.

In an embodiment of the present invention, traffic management module 324 handles graceful shutdown of a firewall security device, such as firewall security device 208*a*. Traffic management module 324 receives a shutdown indication message from firewall security device 208*a* when firewall security device 208*a* is about to shutdown. Traffic management module 324 then determines a firewall security device that can take the data traffic being handled by firewall security device 208a. For example, if traffic management module 324 determines that firewall security device 208b can take all or some portion of the data traffic being handled by firewall security device 208a, then the targeted session synchronization is performed between firewall security devices 208b and 208a (and others as necessary). As a result of such targeted session synchronization, the relevant sessions handled by both firewall security devices 208a and 208b get synchronized and load balancing table 318 will be updated by traffic management module 324 accordingly. Subsequently, firewall security device 208a can shutdown without causing significant traffic loss.

In one embodiment of the present invention, the functionality of one or more of the above-referenced functional units may be merged in various combinations. For example, data buffer 306 may be incorporated within address extraction module 308 or control message communication module 302 may be incorporated within heartbeat management module 304. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.). In an exemplary embodiment of the present, one or more of the above-referenced functional units may be implemented in a content aware processor, which may comprise a content addressable memory (CAM), such as a ternary CAM (TCAM).

According to various embodiments of the present invention, the functional modules can be any suitable type of logic (e.g., digital logic) for executing the operations described herein. Any of the functional modules used in conjunction with embodiments of the present invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 4:
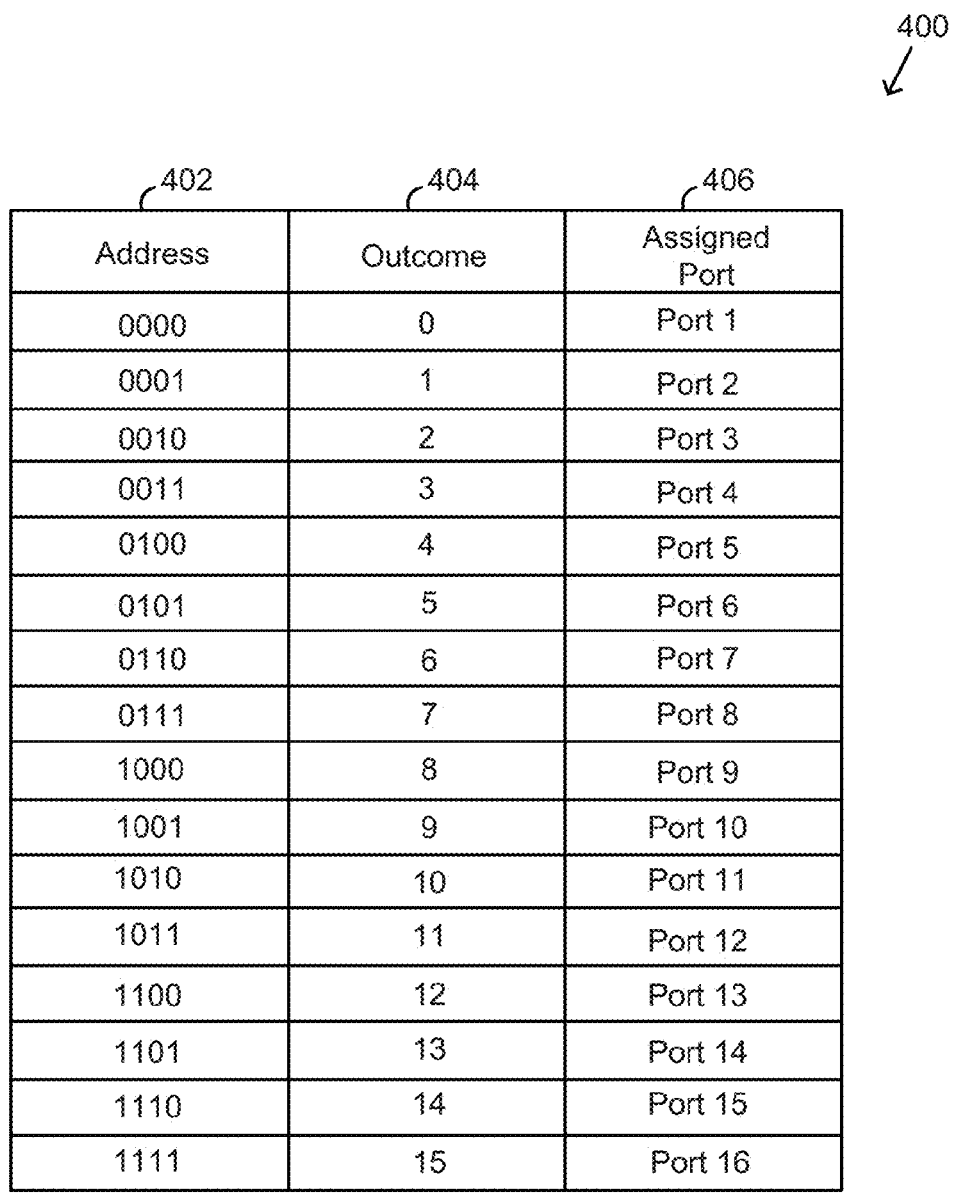
FIG. 4 conceptually illustrates a load balancing table maintained by a switching device in accordance with an exemplary embodiment of the present invention.

FIG. 4 conceptually illustrates a load balancing table 400 maintained by a switching device in accordance with an exemplary embodiment of the present invention.

Load balancing table 400 includes information corresponding to a mapping between one or more ports, such as one or more ports 320 on switching device 106 and one or more bits of addresses contained in a data packet received from one or more client devices 118. Further, one or more ports 320 are connected to corresponding firewall security devices 208.

In an exemplary embodiment of the present invention, column 402 represents four bits from the address contained in the data packet received from a client device, such as client device 118a. As discussed in conjunction with FIG. 3, the hash bits may be predetermined and/or configurable (e.g., selected by the administrator). In an embodiment of the present invention, column 402 represents a plurality of bits from the destination address contained in the data packet. In another embodiment of the present invention, column 402 represents a plurality of bits from the source address contained in the data packet. In yet another embodiment of the present invention, column 402 represents a plurality of bits from the combination of the destination address and the source address contained in the data packet. Other combinations of bits are contemplated as indicated above.

Column 404 represents an outcome of the hash function in accordance with an exemplary embodiment of the present invention as discussed in detail in conjunction with FIG. 3. The following rule has been applied on four bits selected from the destination address to calculate the outcome:

$$f(N)=D_{N-1}*2^{N-1}+ \ldots +D_2*2^2+D_1*2^1+D_0*2^0;$$

Where N=value of hash bit.

In this case N=4, hence for example, for the address bit combination of $(D_3, D_2, D_1, D_0)=1101$, the corresponding outcome would be 13. Following is the calculation:

$$f(4) = 1*2^3 + 1*2^2 + 0*2^1 + 1*2^0$$
$$= 13;$$

Column 406 depicts the port assignment configured by an administrator, for example, in accordance with an exemplary embodiment. For example, for the address bit combination of 1101 a port 14 is assigned and all the data traffic containing 1101 bit combination in the respective bits of destination address are redirected to port 14.

Figure 5A:
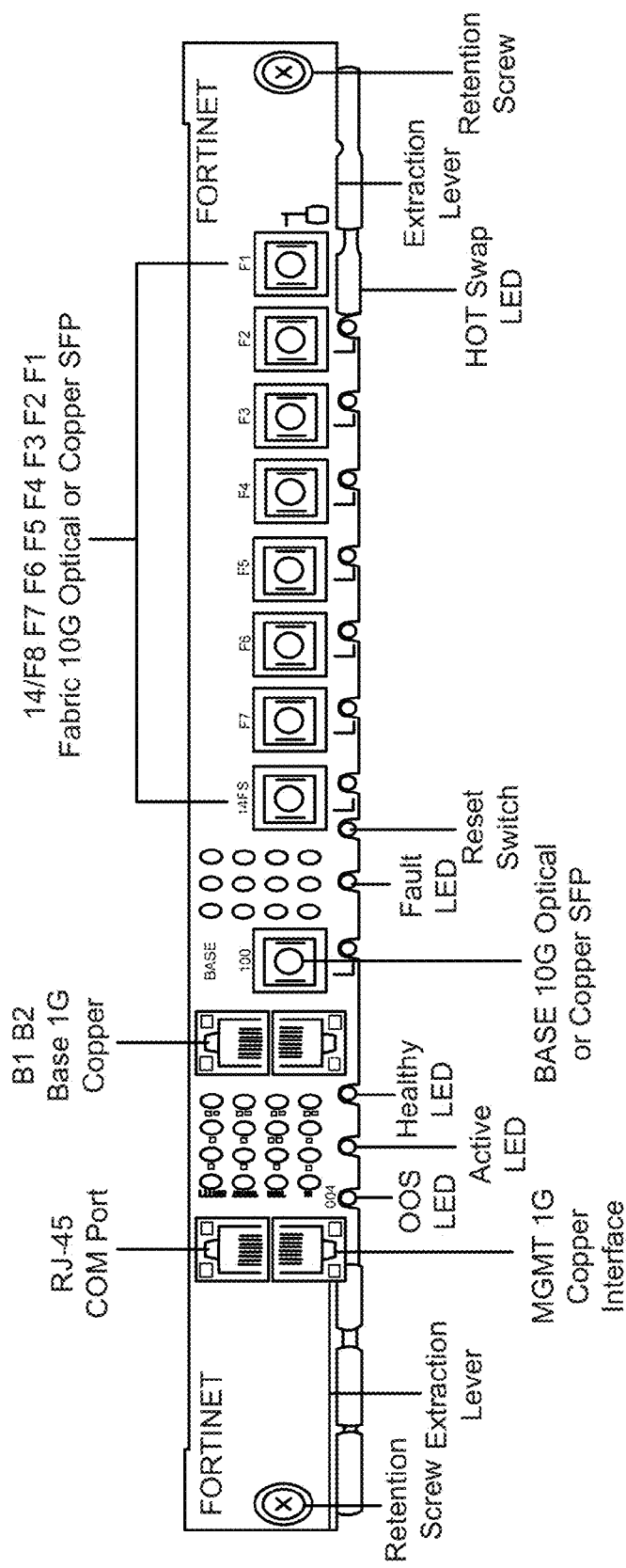
FIGS. 5A and 5B conceptually illustrate a front panel of a switching device in accordance with exemplary embodiments of the present invention.
Figure 5B:
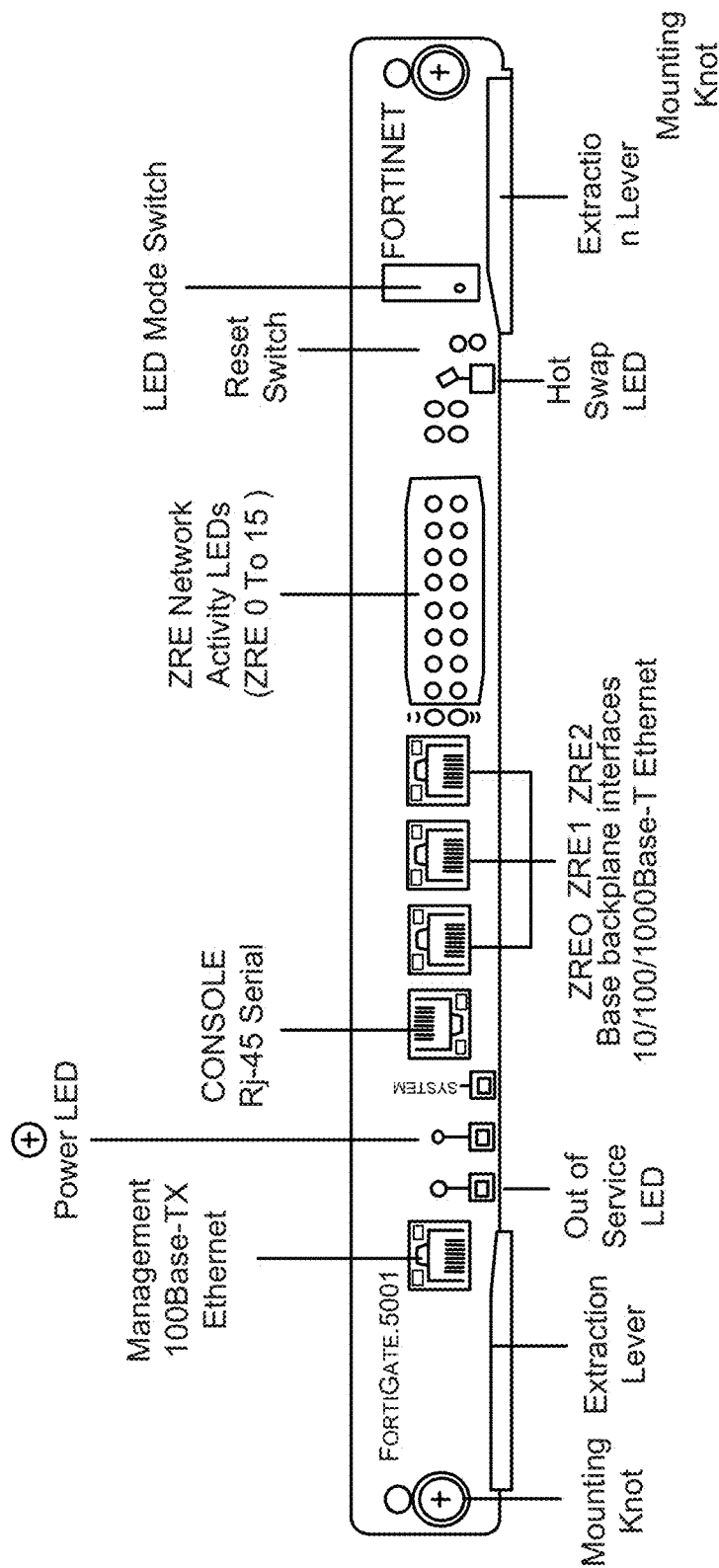

FIG. 5A and 5B conceptually illustrate a front panel 500 of a switching device in accordance with exemplary embodiments of the present invention. As discussed in conjunction with FIG. 2, an example of a switching device as used in an embodiment of the present invention could be a FORTISWITCH-5003A or a FORTISWITCH-5003 with some modifications as discussed in conjunction with FIG. 3.

FIG. 5A depicts a pictorial view of a FORTISWITCH-5003A board. The FORTISWITCH-5003A board provides 10/1-gigabit fabric backplane channellayer-2 switching and 1-gigabit base backplane channel layer-2 switching in a dual star architecture for the FORTIGATE-5140 and FORTIGATE-5050 chassis. The FORTISWITCH-5003A board provides a total capacity of 200 Gigabits per second (Gbps) throughput.

The FORTIGATE-5140 chassis is a 14-slot advanced telecommunications computing architecture (ATCA) chassis and the FORTIGATE-5050 chassis is a 5-slot ATCA chassis. In both chassis the FORTISWITCH-5003A board is installed in the first and second hub/switch fabric slots. A FORTISWITCH-5003A board can be used for fabric and base backplane layer-2 switching for FORTIGATE-5000A boards installed in slots 3 and up in FORTIGATE-5140 and FORTIGATE-5050 chassis. Similarly, a FORTISWITCH-5003A board can also be used for fabric and base backplane layer-2 switching for FORTIGATE-5000 boards installed in slots 3 and up in FORTIGATE-5140 and FORTIGATE-5050 chassis. Usually, the base channel is used for management traffic (for example, the heartbeat signal communication) and the fabric channel for data traffic. FORTISWITCH-5003A boards can be used for fabric and base backplane layer-2 switching within a single chassis and between multiple chassis. The FORTISWITCH-5003A board in hub/switch fabric slot 1 provides communications on fabric channel 1 and base channel 1. A FORTISWITCH-5003A board in hub/switch fabric slot 2 provides communications on fabric channel 2 and base channel 2. If the chassis includes one FORTISWITCH-5003A board one can install it in hub/switch fabric slot 1 or 2 and configure the FORTIGATE-5000A boards installed in the chassis to use the correct fabric and base backplane interfaces. Similarly, if the chassis includes one FORTISWITCH-5003A board one can install it in hub/switch fabric slot 1 or 2 and configure the FORTIGATE-5000 boards installed in the chassis to use the correct fabric and base backplane interfaces. For a complete 10-gigabit fabric backplane solution FORTIGATE-5000 hardware can be installed to support 10-gigabit connections. For example, a FORTIGATE-5001A board combined with a FORTIGATE-RTM-XB2 module provides two 10-gigabit fabric interfaces. In particular, one can install FORTIGATE-5001A boards in chassis slots 3 and up and FORTIGATE-RTM-XB2 modules in the corresponding RTM slots on the back of the chassis. The FORTISWITCH-5003A board includes the following features:

- One 1-gigabit base backplane channel for layer-2 base backplane switching between FORTIGATE-5000 boards installed in the same chassis as the FORTISWITCH-5003A
- One 10/1-gigabit fabric backplane channel for layer-2 fabric backplane switching between FORTIGATE-5000 boards installed in the same chassis as the FORTISWITCH-5003A
- Two front panel base backplane one-gigabit copper gigabit interfaces (B1 and B2) that connect to the base backplane channel.

FIG. 5B depicts a pictorial view of a FORTISWITCH-5003 board. The FORTISWITCH-5003 board provides base backplane interface switching for the FORTIGATE-5140 chassis and the FORTIGATE-5050 chassis. One can use this switching for data communication or HA heartbeat communication between the base backplane interfaces of FORTIGATE-5000 series boards installed in slots 3 and up in these chassis. FORTISWITCH-5003 boards can be used for base backplane communication in a single chassis or between multiple chassis. FORTISWITCH-5003 boards may be installed in chassis slots 1 and 2. A FORTISWITCH-5003 board in slot 1 provides communications on base backplane interface 1. A FORTISWITCH-5003 board in slot 2 provides communications on base backplane interface 2. In case of a configuration that includes only one FORTISWITCH-5003 board, it can be installed in slot 1 or slot 2 and the FORTIGATE-5000 boards installed in the chassis can be configured to use the correct base backplane interface.

Figure 6A:
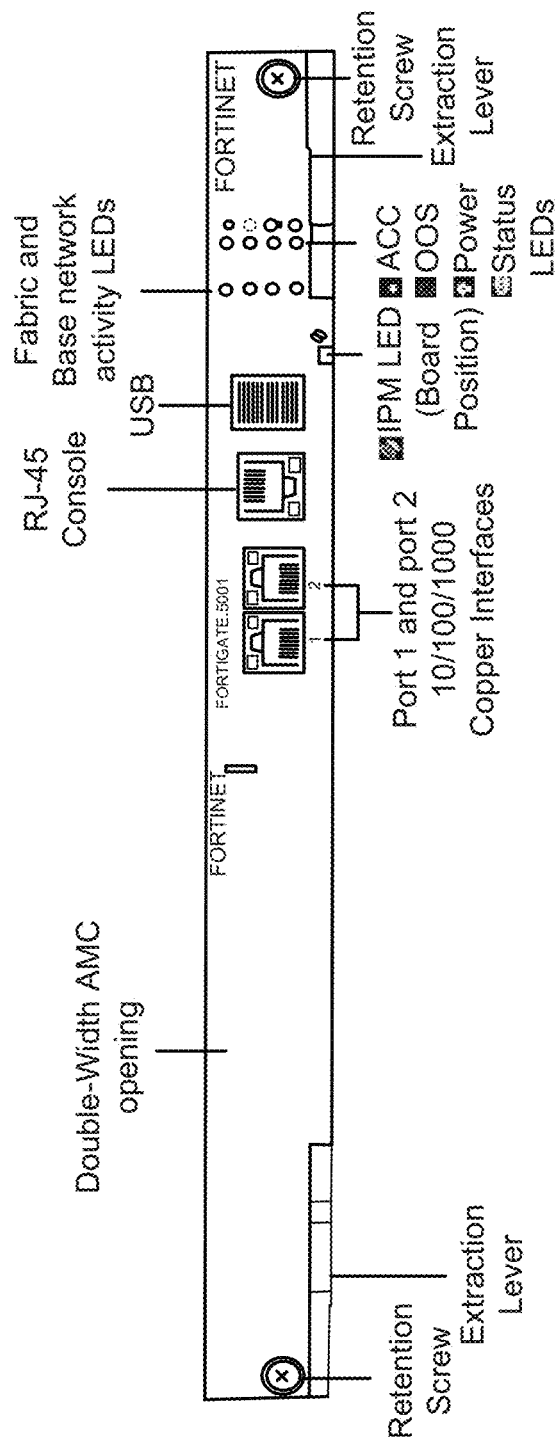
FIGS. 6A, 6B, and 6C conceptually illustrate a front panel of a firewall security device in accordance with exemplary embodiments of the present invention.
Figure 6B:
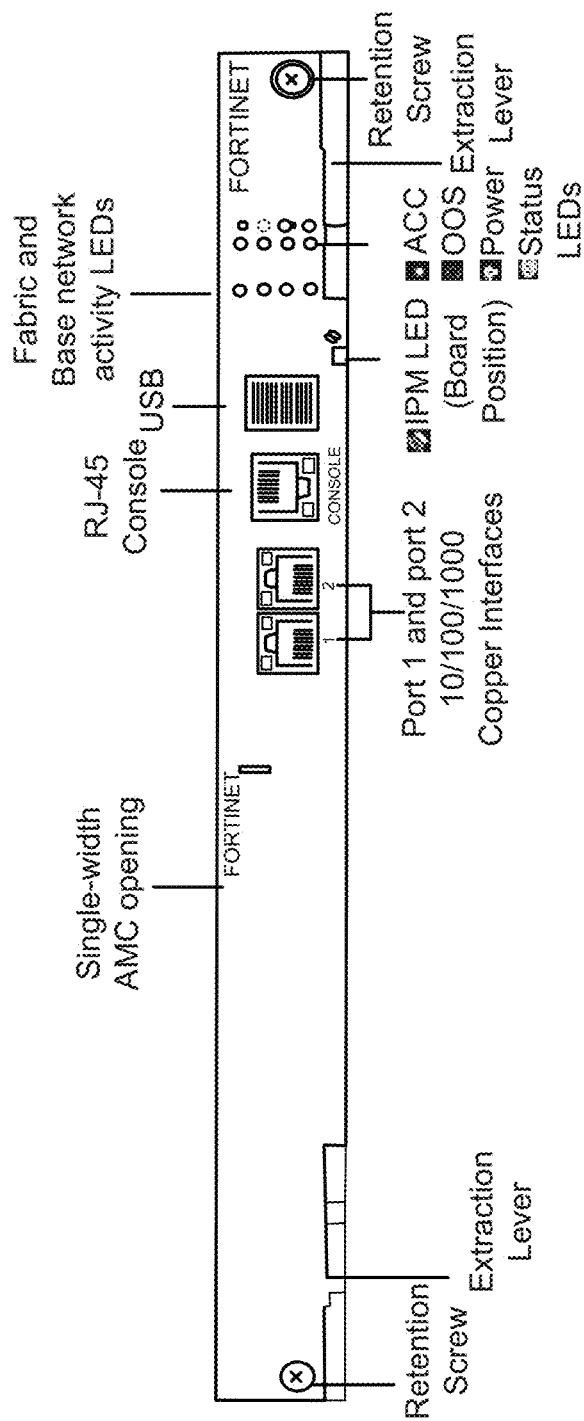
Figure 6C:
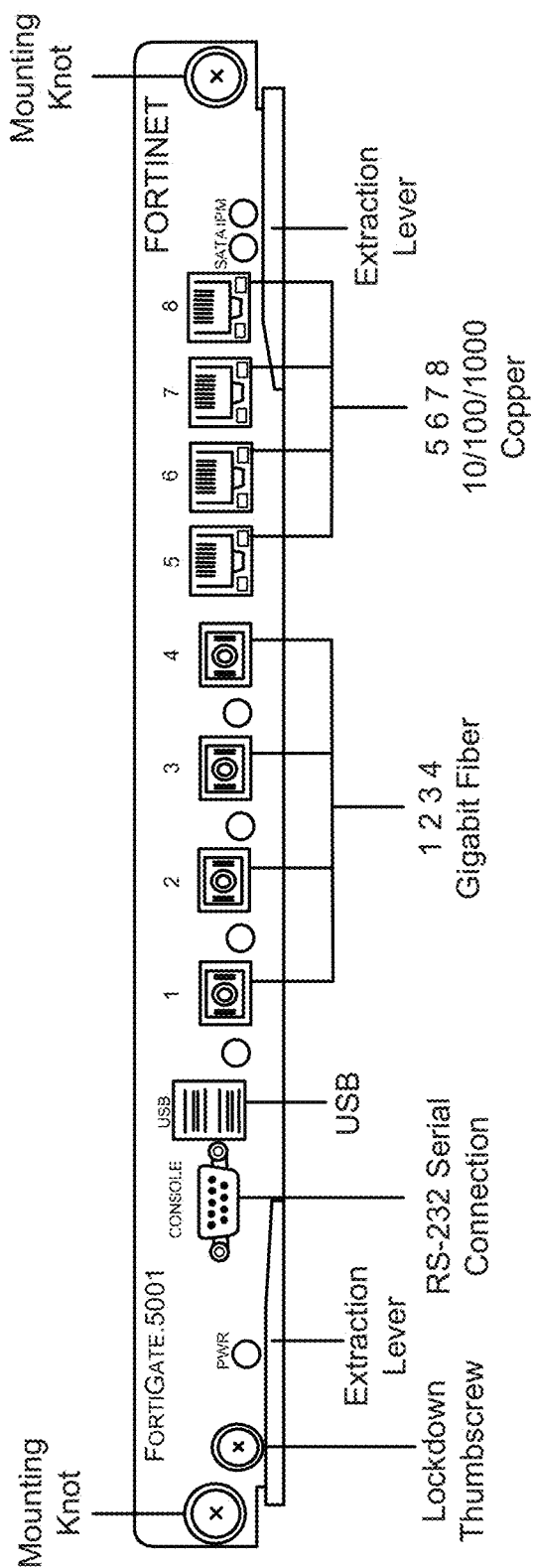

The FORTISWITCH-5003 board includes the following features:

- A total of 16 10/100/1000 Base-T gigabit Ethernet interfaces:
- 13 backplane 10/100/1000 Base-T gigabit interfaces for base backplane switching between FORTIGATE-5000 series boards installed in the same chassis as the FORTISWITCH-5003
- Three front panel 10/100/1000 Base-T gigabit interfaces (ZRE0, ZRE1, ZRE2) for base backplane switching between two or more FORTIGATE-5000 series chassis
- One 100 Base-TX out of band management Ethernet interface (ETH0)
- RJ-45 RS-232 serial console connection (CONSOLE)
- Mounting hardware
- LED status indicators FIGS. 6A, 6B, and 6C conceptually illustrates a front panel of a firewall security device in accordance with exemplary embodiments of the present invention.

The FORTIGATE-5001A security system is a high-performance ACTA compliant FORTIGATE security system that can be installed in any ACTA chassis including the FORTIGATE-5140, FORTIGATE-5050, or FORTIGATE-5020 chassis. Further, the FORTIGATE-5001A security system contains two front panel 1-gigabit Ethernet interfaces, two base backplane 1-gigabit interfaces, and two fabric backplane 1-gigabit interfaces. The front panel interfaces are used for connections to networks and the backplane interfaces for communication across the ACTA chassis backplane.

If one installs a FORTIGATE-RTM-XB2 module for each FORTIGATE-5001A board, the FORTIGATE-5001A fabric interfaces can operate at 10 Gbps. The FORTIGATE-RTM-XB2 also provides NP2-accelerated network processing for eligible traffic passing through the FORTIGATE-RTM-XB2 interfaces.

FIG. 6A depicts a pictorial view of a FORTIGATE-5001A-DW board. The FORTIGATE-5001A-DW (double-width) board includes a double-width Advanced Mezzanine Card (AMC) opening. One can install a supported FORTIGATE ADM module such as the FORTIGATE-ADM-XB2 or the FORTIGATE-ADM-FB8 in the AMC opening. The FORTIGATE-ADM-XB2 adds two accelerated 10-gigabit interfaces to the FORTIGATE-5001A board and the FORTIGATE-ADM-FB8 adds 8 accelerated 1-gigabit interfaces.

FIG. 6B depicts a pictorial view of a FORTIGATE-5001A-SW board. The FORTIGATE-5001A-SW (single-width) includes a single-width AMC opening. One can install a supported FORTIGATE ASM module such as the FORTIGATE-ASM-FB4 or the FORTIGATE-ASM-S08 in the AMC opening. The FORTIGATE-ASM-FB4 adds four accelerated 1-gigabit interfaces to the FORTIGATE-5001A board and the FORTIGATE-ADM-S08 adds a removable hard disk that one can use to store log files and content archives.

Other than the double-width and single-width AMC openings, the FORTIGATE-5001A-DW and SW models have the same functionality and performance.

FIG. 6C depicts a pictorial view of a FORTIGATE-5001SX board. The FORTIGATE-5001SX security system is an independent high performance FORTIGATE security system with eight gigabit Ethernet interfaces. Further, the FORTIGATE-5001SX security system is a high-performance FORTIGATE security system with a total of 8 front panel gigabit Ethernet interfaces and two base backplane interfaces. The front panel interfaces are used for connections to networks and the backplane interfaces for communication between FORTIGATE-5000 series boards over the FORTIGATE-5000 chassis backplane. Two or more FORTIGATE-5001SX boards can also be configured to create a high availability (HA) cluster using the base backplane interfaces for HA heartbeat communication through chassis backplane, leaving all eight front panel gigabit interfaces available for network connections.

Figure 7:
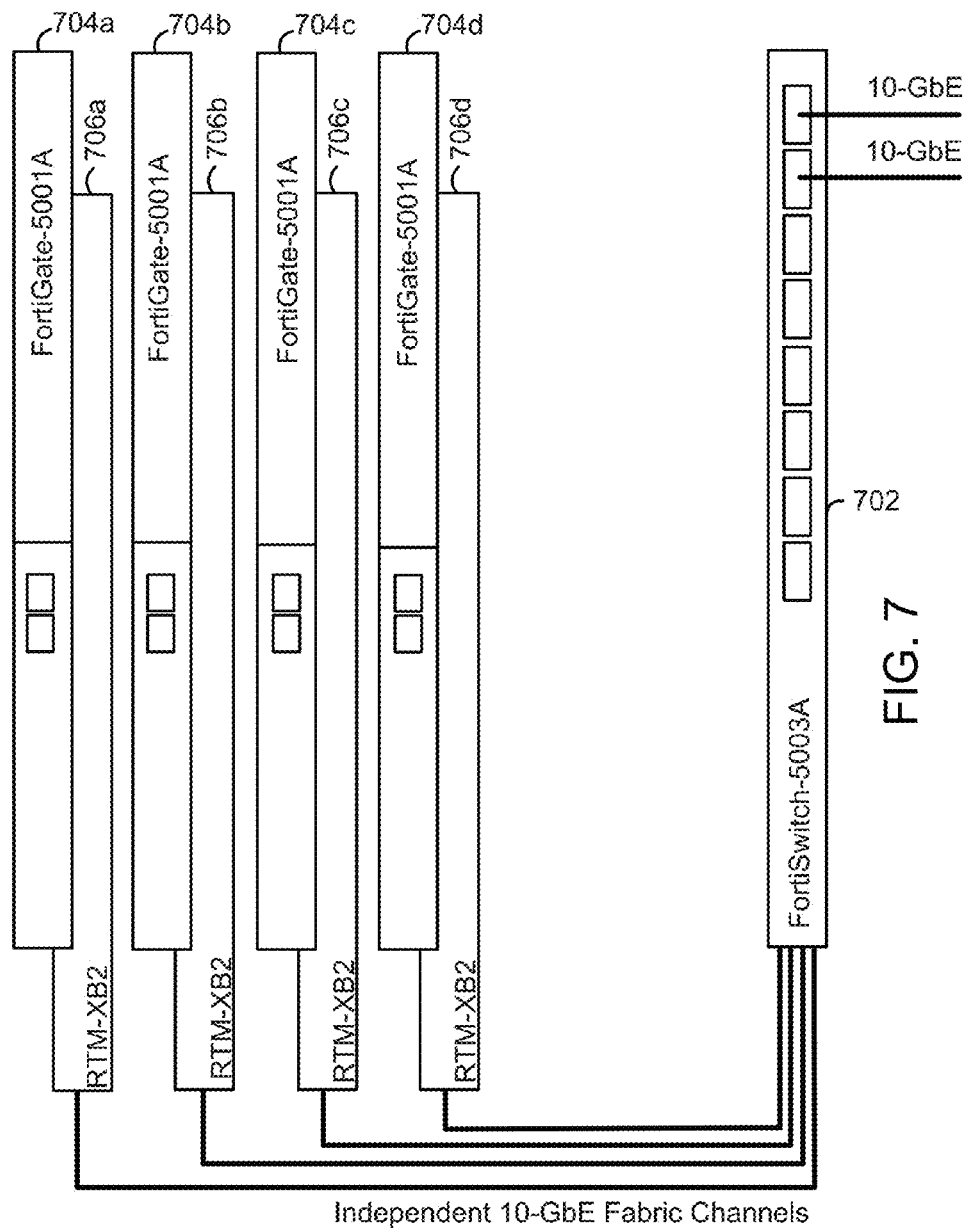
FIG. 7 conceptually illustrates connection of firewall security devices with a switching device through rear transition modules (RTM) in accordance with an exemplary embodiment of the present invention.

FIG. 7 conceptually illustrates connection of firewall security devices with a switching device through rear transition modules (RTM) in accordance with an exemplary embodiment of the present invention.

In this configuration, traffic from the two 10-Gigabit Ethernet links is distributed by FORTISWITCH-5003A 702 to one of the four FORTIGATE-5001A security blades selected from FORTIGATE-5001A 704a, FORTIGATE-5001A 704b, FORTIGATE-5001A 704c, and FORTIGATE-5001A 704d through an RTM-XB2 module 706a, an RTM-XB2 module 706b, an RTM-XB2 module 706c, and an RTM-XB2 module 706d, hereinafter referred to as RTM-XB2 modules 706, respectively. The FORTISWITCH-5003A 702 can balance traffic load automatically. Further, the FORTISWITCH-5003A can direct the traffic flows to one of the FORTIGATE blades for security inspection. The traffic flow is routed to the FORTIGATE 5001A security blade via the 10-Gigabit Fabric channel link of RTM-XB2 module. It will be apparent to a person ordinarily skilled in the art that many combinations of FORTIGATE-5000 Series components are possible due to the modular nature of the system. The FORTIGATE-RTM-XB2 system provides two 10-gigabit fabric backplane interfaces for FORTIGATE-5001A boards installed in FORTIGATE-5140 and FORTIGATE-5050 chassis.

Figure 8A:
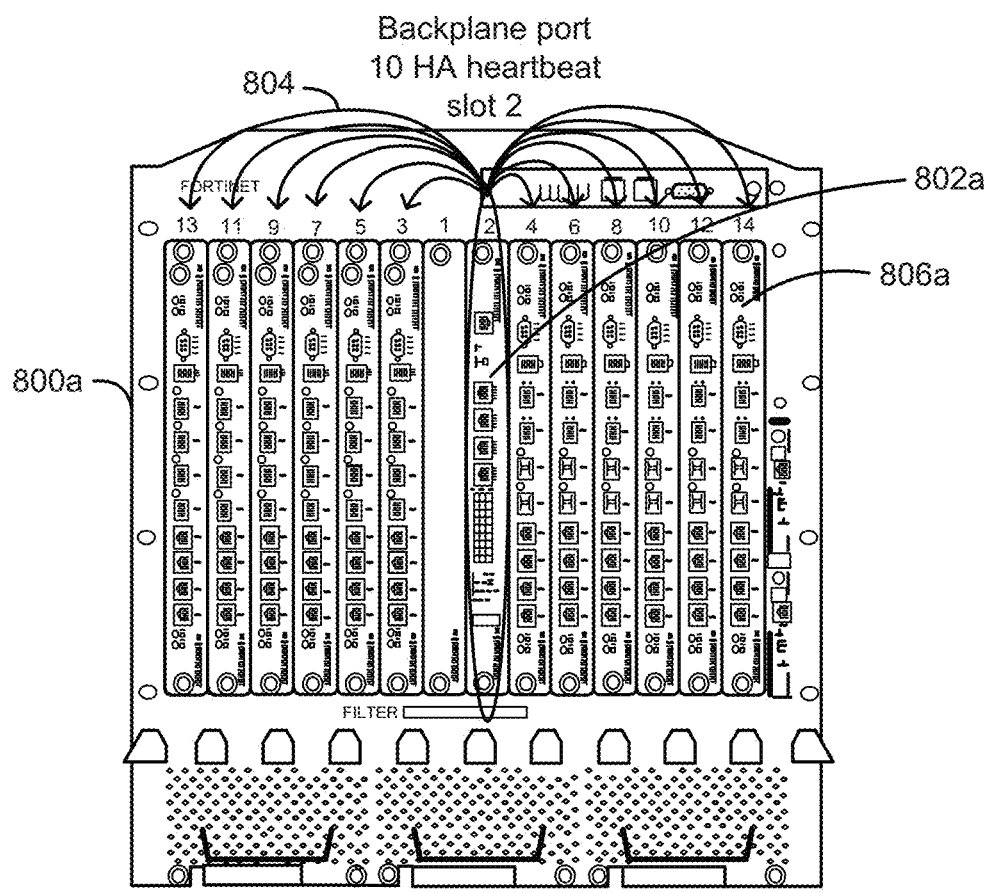
FIGS. 8A and 8B conceptually illustrate connection of firewall security devices installed on a chassis with a switching device in accordance with exemplary embodiments of the present invention.
Figure 8B:
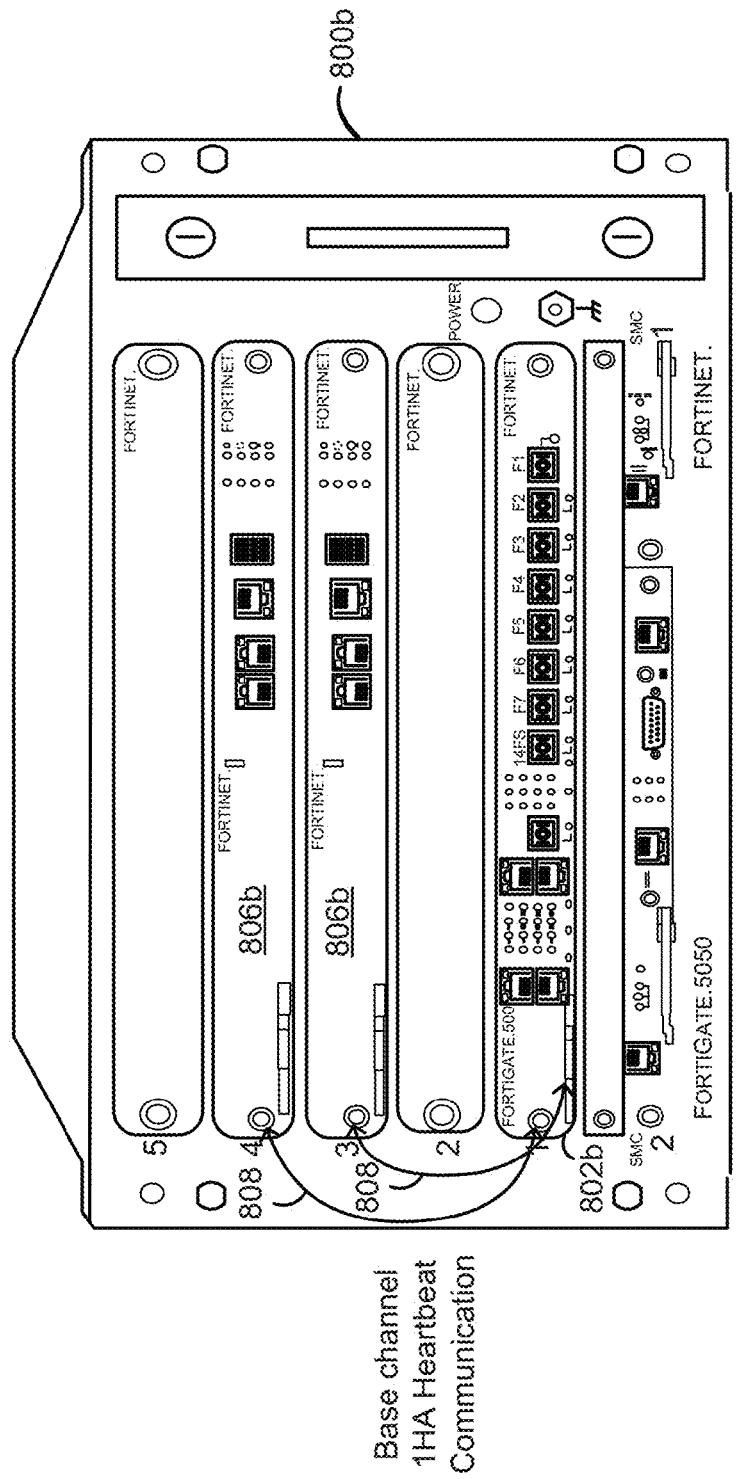

FIG. 8A and 8B conceptually illustrate connection of firewall security devices installed on a chassis with a switching device in accordance with exemplary embodiments of the present invention.

FIG. 8A conceptually illustrates connection of firewall security devices with a switching device in accordance with an exemplary embodiment of the present invention. Installing a single FORTISWITCH-5003module 802*a* in a FORTIGATE-5140 chassis 800*a* provides a single backplane HA heartbeat communication link 804 for up to 12 FORTIGATE-5001FA2 series modules 806*a* installed in chassis slots 3 to 14, as illustrated in FIG. 8A. In an embodiment of the present invention, a single FORTISWITCH-5003 module 802*a* is installed in slot 2 of the FORTIGATE-5140 chassis 800*a*. However, installation of FORTISWITCH-5003 module 802*a* is not limited to slot 2. In another embodiment of the present invention, a FORTISWITCH-5003 module 802*a* can also be installed in slot 1. Further, port 9 and port 10 may be default HA heartbeat communication links for FORTIGATE-5001FA2 series modules 806*a*. Various HA heartbeat communication links 804 between FORTIGATE-5001FA2 modules 806*a* and FORTISWITCH-5003 module 802*a* are just for the purpose of illustration only. A FORTISWITCH-5003 module 802*a* installed in slot 2 means an HA cluster of FORTIGATE-5001FA2 series modules 806*a* use port 10 for HA heartbeat communication. Therefore, no change to the FORTIGATE-5001FA2 series module 806*a* default HA heartbeat configuration is required. It will be apparent to a person ordinarily skilled in the art that one or more ports selected from port 2 to port 8 of FORTISWITCH-5003 module 802*a* can be set as HA heartbeat interfaces so that HA heartbeat communication failover to one of these interfaces can be performed if backplane communication fails or is interrupted.

FIG. 8B conceptually illustrates connection of firewall security devices with a switching device in accordance with another exemplary embodiment of the present invention. FIG. 8B depicts a FORTIGATE-5050 chassis 800*b* with a FORTISWITCH-5003A module 802*b* in slot 1 and two FORTIGATE-5001A modules 806*b* in slots 3 and 4. In this configuration, FORTIGATE-5001A modules 806*b* are using base channel 1 808 for HA heartbeat communication. FORTIGATE-5001A module 806*b* uses base channel 1 808 as the HA heartbeat interface. Various HA heartbeat communication links 808 between FORTIGATE-5001A modules 806 and FORTISWITCH-5003A module 802*b* are just for the purpose of illustration only.

Figure 9:
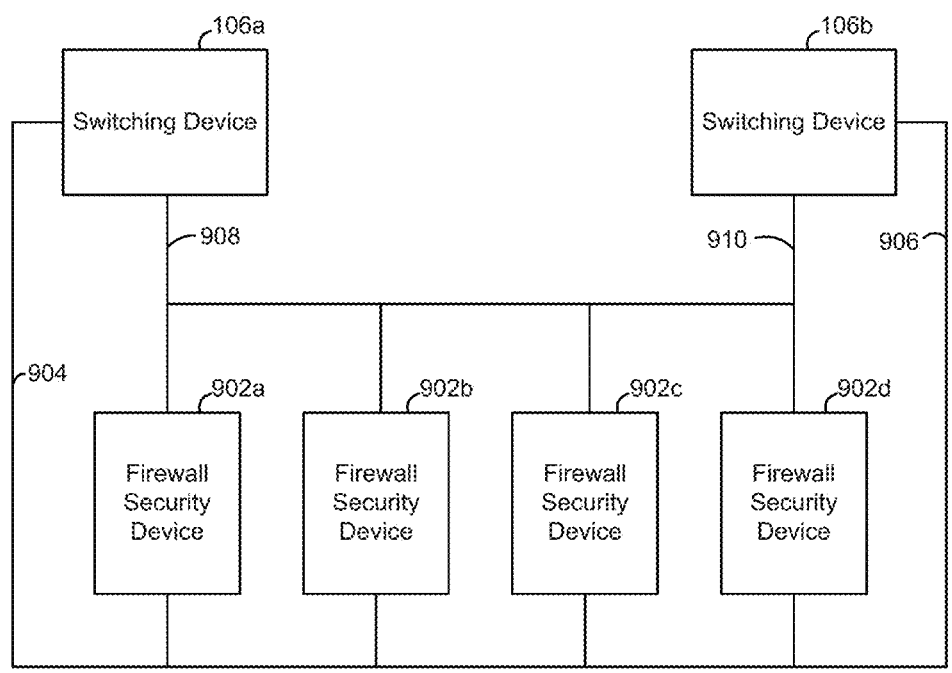
FIG. 9 conceptually illustrates connection of firewall security devices with two switching devices in accordance with an embodiment of the present invention.

FIG. 9 conceptually illustrates connection of firewall security devices with two switching devices in accordance with an embodiment of the present invention.

According to an embodiment of the present invention, active-passive HA configuration can include two switching devices such as switching devices 106*a* and 106*b*. Further, one or more firewall security devices such as firewall security devices 902*a*, 902*b*, 902*c*, and 902*d*, hereinafter referred to as one or more firewall security devices 902, are connected to switching devices 106*a* and 106*b*. One or more firewall security devices 902 form an HA cluster.

The heartbeat signals communication between one or more firewall security devices 902 and switching device 106*a* is performed over a heartbeat communication channel 904. Similarly, the heartbeat signals communication between one or more firewall security devices 902 and switching device 106*b* is performed over a heartbeat communication channel 906. In an embodiment of the present invention, heartbeat communication channel 904 includes heartbeat signal-carrying wire conductors from each of one or more firewall security devices 902 to switching device 106*a*. Similarly, heartbeat communication channel 906 includes heartbeat signal-carrying wire conductors, other than those used for heartbeat communication channel 904, from each of one or more firewall security devices 902 to switching device 106*b*.

The data communication between one or more firewall security devices 902 and switching device 106*a* is performed over a data communication channel 908. The data communication between one or more firewall security devices 902 and switching device 106*b* is performed over a data communication channel 910. In an embodiment of the present invention, the data communication channel includes an Ethernet connector from each of one or more firewall security devices 902 connected to corresponding port on switching device 106*a* and switching device 106*b*.

In an embodiment of the present invention, switching device 106*a* load balances the data traffic among one or more firewall security devices 902, while switching device 106*b* remains idle. In another embodiment of the present invention, switching device 106*b* load balances the data traffic among one or more firewall security devices 902, while switching device 106*a* remains idle. Thus, this configuration provides redundant HA heartbeat communication for one or more security devices 902. In case switching device 106*a* fails, switching device 106*b* takes charge of load balancing without interrupting the HA heartbeat and data traffic communication.

In an embodiment of the present invention, an additional redundant HA heartbeat communication channel is provided between one or more firewall security devices 902 and switching device 106*a*. Similarly, another additional redundant HA heartbeat communication channel is provided between one or more firewall security devices 902 and switching device 106*b*. Thus, for example, if one HA heartbeat link between firewall security device 902*a* and switching device 106*a* fails, another HA heartbeat link starts communicating the heartbeat signals without interrupting the data traffic flow. Hence, this configuration provides improved reliability in load balancing.

Figure 10:
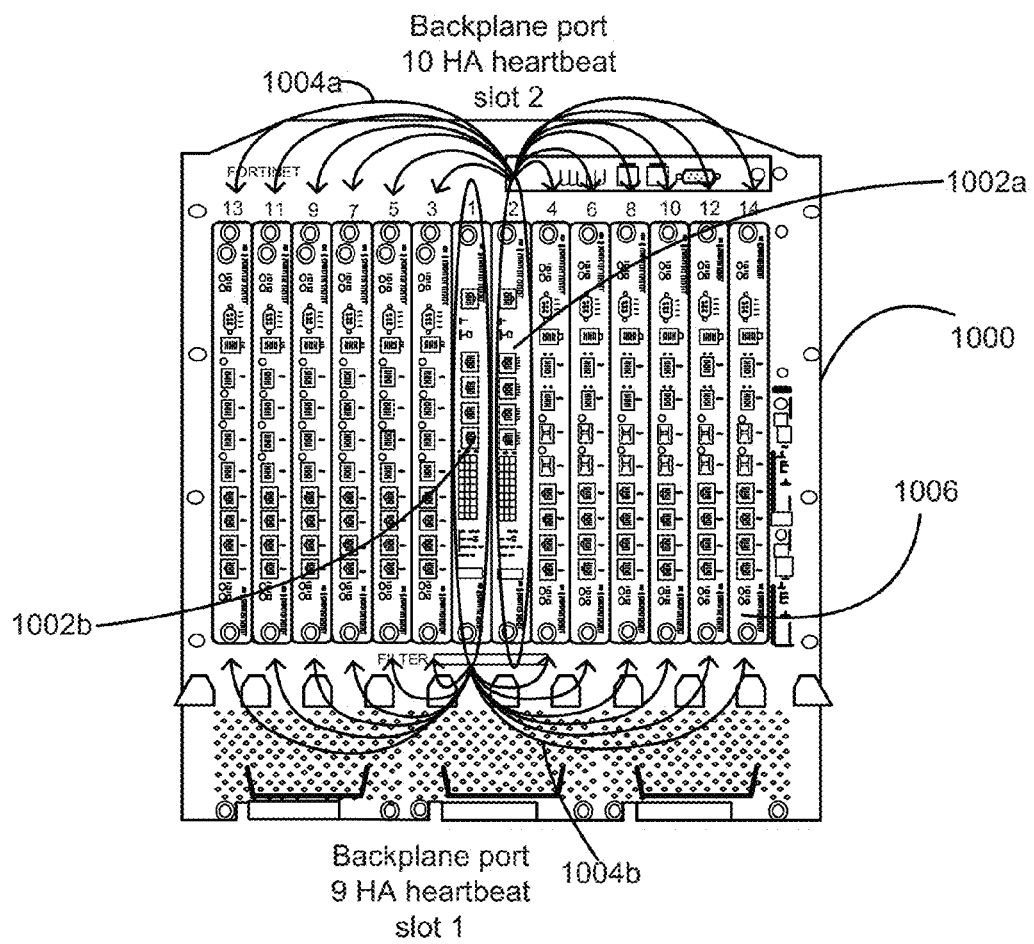
FIG. 10 conceptually illustrates connection of firewall security devices with two switching devices in accordance with an exemplary embodiment of the present invention.

FIG. 10 conceptually illustrates connection of firewall security devices with two switching devices in accordance with an exemplary embodiment of the present invention. FORTISWITCH-5003 modules 1002*a* and 1002*b* installed in slots 2 and 1 respectively provide HA heartbeat communication on port 10 and port 9 of FORTIGATE-5001FA2 modules 1006 installed in slots 3 to 14 in FORTIGATE-5140 chassis 1000. For example, FORTISWITCH-5003 module 1002*a* is connected on port 10 of each FORTIGATE-5001FA2 modules 1006 for HA heartbeat communication. Various HA heartbeat communication links 1004*a* between FORTIGATE-5001FA2 modules 1006 and FORTISWITCH-5003 module 1002*a* are just for the purpose of illustration only. FORTISWITCH-5003 module 1002*b* is connected on port 9 of each FORTIGATE-5001FA2 modules 1006 for HA communication. Various HA heartbeat communication links 1004*b* between FORTIGATE-5001FA2 modules 1006 and FORTISWITCH-5003 module 1002*b* are just for the purpose of illustration only. Thus, FORTISWITCH-5003 module 1002*b* connected on port 9 of each FORTIGATE-5001FA2 modules 1006 provides redundant HA heartbeat communication. If port 10 fails or becomes disconnected, HA heartbeat communication switches to port 9.

Figure 11:
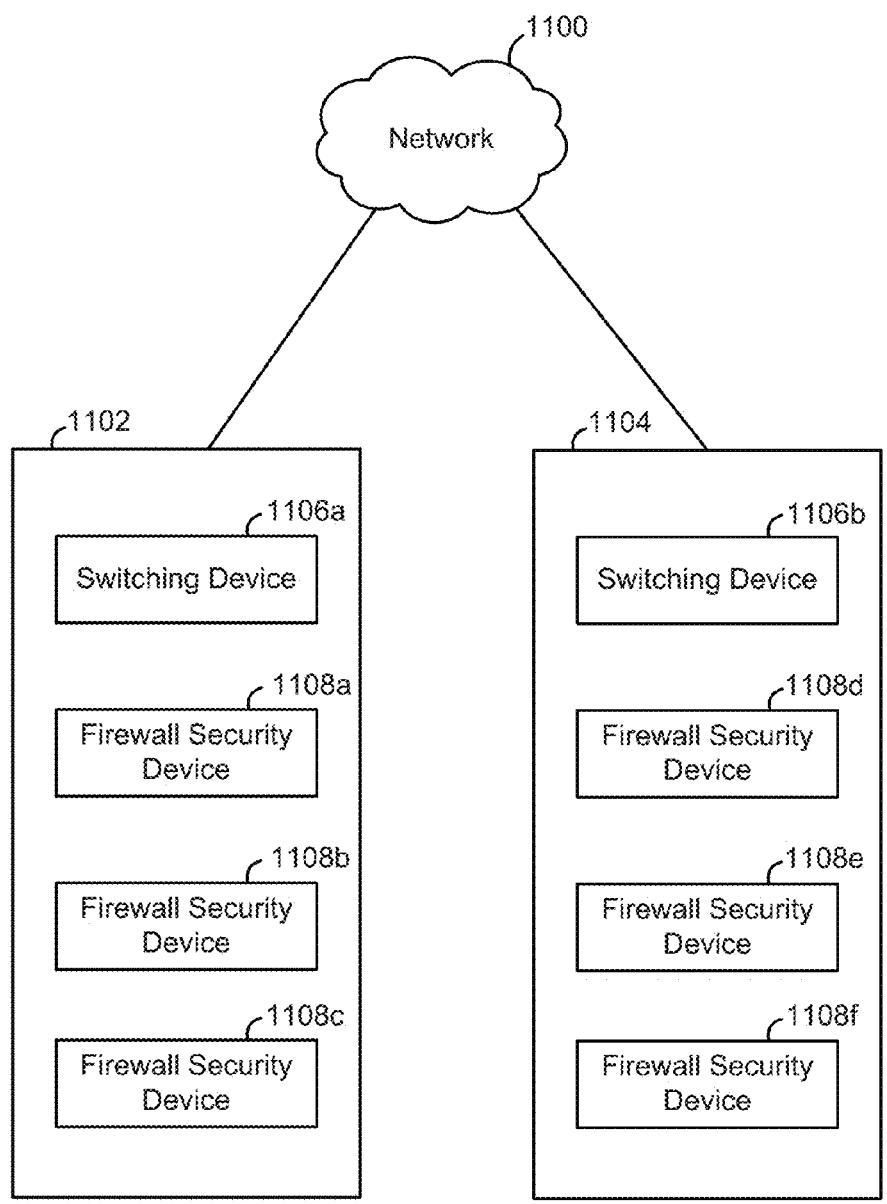
FIG. 11 is a block diagram conceptually illustrating a simplified network architecture for handling asymmetric network data traffic in accordance with an embodiment of the present invention.

FIG. 11 is a block diagram conceptually illustrating a simplified network architecture for handling asymmetric network data traffic in accordance with an embodiment of the present invention.

The network includes chassis 1102 including a switching device 1106*a*, such as switching device 106, and one or more firewall security devices 1108*a*, 1108*b*, and 1108*c*, such one or more firewall security device 208 as discussed in conjunction with FIG. 2. In addition, chassis 1104 includes a switching device 1106*b*, such as switching device 106, and one or more firewall security devices 1108*d*, 1108*e*, and 1108*f*, such as one or more firewall security device 208 as discussed in conjunction with FIG. 2. Further, switching device 1106*a* and switching device 1106*b* each has a unique IP address.

In an embodiment of the present invention, chassis 1102 and chassis 1104 are connected over a network 1100. In an embodiment of the present invention, the network 1100 is an intranet. In an exemplary embodiment of the present invention, the intranet may be a multiprotocol label switching (MPLS) cloud. In another embodiment of the present invention, the network 1100 is the Internet. In yet another embodiment of the present invention, chassis 1102 and chassis 1104 may be located at different geographic locations. For example, chassis 1102 may be located at a New York based office and chassis 1104 may be located at a San Francisco based office. In an exemplary embodiment of the present invention, load balancing among geographically distributed firewall security devices is a function of a calendaring mechanism. The calendaring mechanism is further explained in the following description.

Normally, Internet data traffic on a given link is approximately symmetric. For example, both directions of a data flow is across the same physical link. However, in some situations return data traffic may not follow the same physical link. Sometimes it becomes difficult to handle such asymmetric data traffic flow. For example, consider a situation where a reply data packet, for a data packet originating from the San Francisco based switching device 1106*b*, is received at the New York based switching device 1106*a*.

An address extraction module, such as address extraction module 308, in addition to the extraction of the source address and the destination address (as discussed in conjunction with FIG. 3), checks certain bits of the destination address contained in the received data packet in order to identify if the data packet is intended for another switching device connected over the network 1100. In this case one or more additional bits of the destination address are checked to see if the data packets are intended for switching device 1106*b* mounted on chassis 1104 which is located at the San Francisco based office. Further, the various other functions of address extraction module 308 have been explained in conjunction with FIG. 3. It will be apparent to a person ordinarily skilled in the art that the invention is not limited to the extraction of certain bits only from the source address and destination address, however, any other bit(s) from the received data packet may be extracted and checked to determine if the data packet is intended for another switching device, without limiting the scope of the invention and without deviating from the scope of the invention.

If it is determined by switching device 1106*a* that a data packet was intended to be received by switching device 1106*b*, then the data packet is redirected to switching device 1106*b* over network 1100. Switching device 1106*b* then forwards the data packet to a corresponding firewall security device on chassis 1104 for analyzing the data packet for security check. This configuration provides an active-active HA between the two chassis located at different geographic locations, hence enabling multi-tier load balancing and solving the problem of asymmetric data traffic.

Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 12:
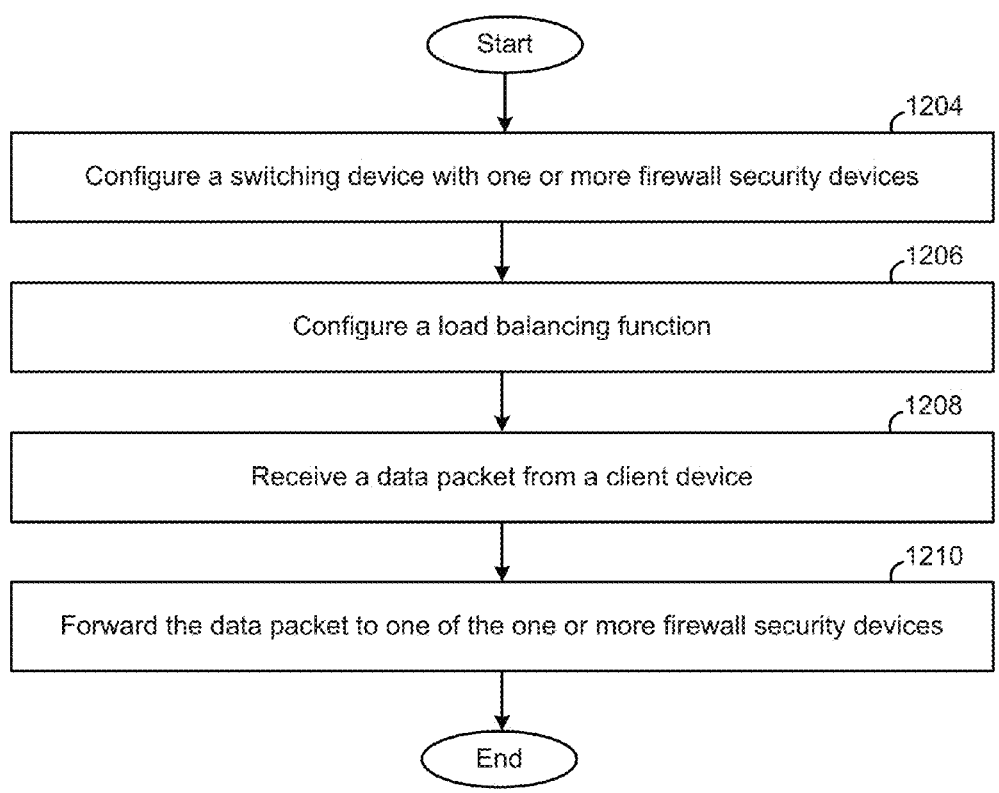
FIG. 12 is a flow diagram illustrating a method for balancing load among one or more firewall security devices in accordance with an embodiment of the present invention.

FIG. 12 is a flow diagram illustrating a method for balancing load among one or more firewall security devices in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 1204, a switching device, such as switching device 106, is configured with one or more firewall security devices, such as one or more firewall security devices 208. Configuration is performed in order to enable the switching device for balancing data traffic load among the one or more firewall security devices. Further, the configuration of the switching device is explained in conjunction with FIG. 13.

At block 1206, a load balancing function is configured in order to distribute the data packets among the one or more ports. As a result of the configuration of the load balancing function, the load balancing table is updated. As discussed in conjunction with FIG. 4, the load balancing function includes the mapping between the one or more firewall security devices in the cluster, the one or more ports and the address of the incoming data packet. Further, the configuration of the load balancing function has been discussed in detail in conjunction with FIG. 14.

At block 1208, a data packet is received at the switching device that needs to be forwarded to one of the firewall security devices in the cluster. The data packet may represent a request for accessing information from one or more computer systems, such as, one or more computer systems 114 from an internal network, such as, network 112. Various examples of the data packet type are IPv4, IPv6, non-IP and so forth. It will be apparent to the person ordinarily skilled in the art that the invention is not limited with respect to the type of data packet. Further, an exemplary IPv4 data packet is explained in an exemplary embodiment of the present invention, in conjunction with FIG. 3.

Further, after the reception of the data packet, one or more bits from at least one of the source address and the destination address are extracted. For example if the administrator has configured hash bit value as Five and elected to perform load balancing based on the destination address, then Five bits from the destination address are extracted.

At block 1210, the data packet is forwarded to one of the firewall security devices based on the extracted address, the load balancing function and load balancing table.

Figure 13:
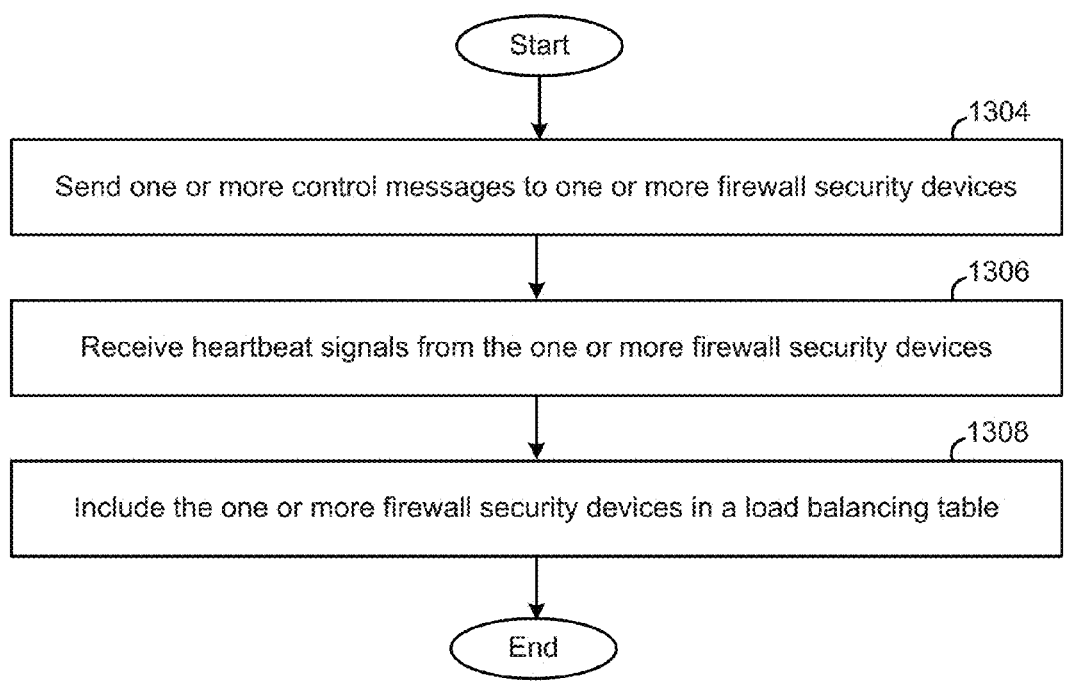
FIG. 13 is a flow diagram illustrating a method for configuring a switching device in accordance with an embodiment of the present invention.

FIG. 13 is a flow diagram illustrating a method for configuring a switching device in accordance with an embodiment of the present invention.

At block 1304, one or more control messages are sent to the one or more firewall security devices by a switching device. This is a very basic step to configure any newly mounted (installed) security device in load balancing mode. In response to the reception of such control messages the firewall security device synchronizes its operation with other firewall security devices in a cluster. In an embodiment of the present invention, multiple synchronization messages are exchanged between the firewall security device and other firewall security devices in a cluster.

Further, as discussed in conjunction with FIG. 2, after synchronizing the operation with other cluster members, a VLAN device is created by the firewall security device that corresponds to a port on the switching device. In an embodiment of present the invention, two VLAN devices may be created by the firewall security device, which may represent a pair of ports on the switching device. After the creation of VLAN devices by the firewall security device, corresponding VLAN identifiers (IDs) are assigned to ports by the switching device.

At block 1306, heartbeat signals are received from the firewall security device. As discussed in conjunction with FIG. 2, the heartbeat signals consist of hello packets that are sent by the firewall security device at regular intervals to the switching device. These hello packets describe the state of the firewall security device and are also used by other cluster units to keep all cluster units synchronized.

After the successful configuration of the firewall security device, at block 1308, the configured firewall security device is included in a load balancing table, such as the load balancing table 318, as discussed in conjunction with FIG. 3 and FIG. 4.

Figure 14:
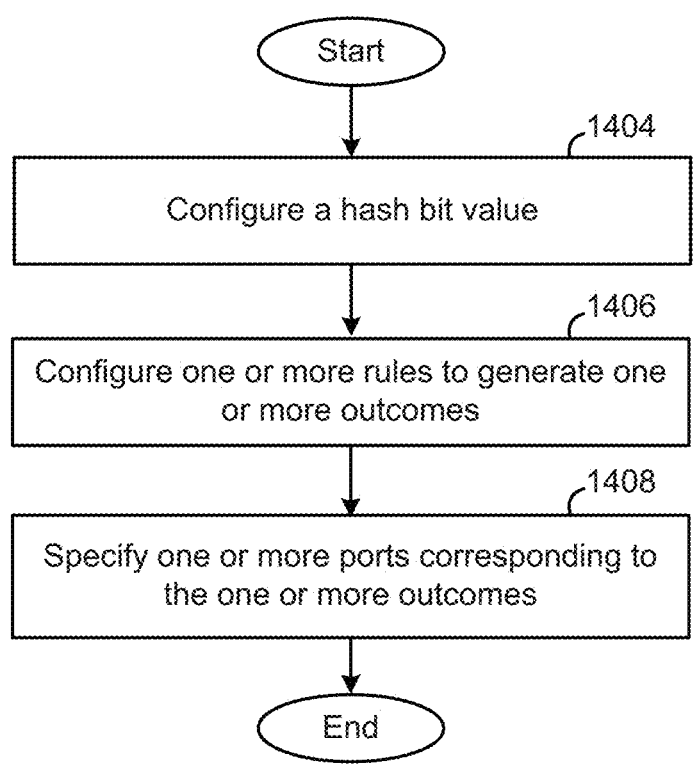
FIG. 14 is a flow diagram illustrating a method for configuring a load balancing function in accordance with an embodiment of the present invention.

FIG. 14 is flow diagram illustrating a method for configuring a load balancing function in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 1404, the number of bits to be hashed and/or the input size of the hash are configured by an administrator of the network. In an embodiment of the present invention, the number of bits to be hashed is five. In an embodiment of the present invention, various bits from the source address and/or the destination are also selected by the administrator for hashing. In another embodiment of the present invention, the administrator can also select at least one of a source address or destination address for hashing.

At block 1406, one or more rules are configured by the administrator for generating one or more outcomes based on the selected hash bit value. In an embodiment the rule is $$f(x)=D_{N-1}*2^{N-1}+\ldots+D_2*2^2+D_1*2^1+D_0*2^0;$$

Where N=value of hash bit.

It will be apparent to a person ordinarily skilled in the art that different types of rules may be configured by the administrator without deviating from the scope of the invention.

In an exemplary embodiment of the present invention, an initial five bits of the destination address ($D_4$, $D_3$, $D_2$, $D_1$, $D_0$) are selected by the administrator for the purpose of hashing. Thus, a maximum of 32 (thirty-two) outcomes can be obtained. Further, it will be apparent to a person ordinarily skilled in the art that any combination of bits can be selected by the administrator without limiting the scope of the invention.

At block 1408, an action is assigned to each of the generated outcomes. In an embodiment of the present invention, the action specifies a port of the one or more ports for each outcome. Also, the load balancing table is updated after the allocation of ports for each of the outcomes. As discussed earlier, the load balancing table includes a mapping of the ports to corresponding address values of the received data packets.

Figure 15:
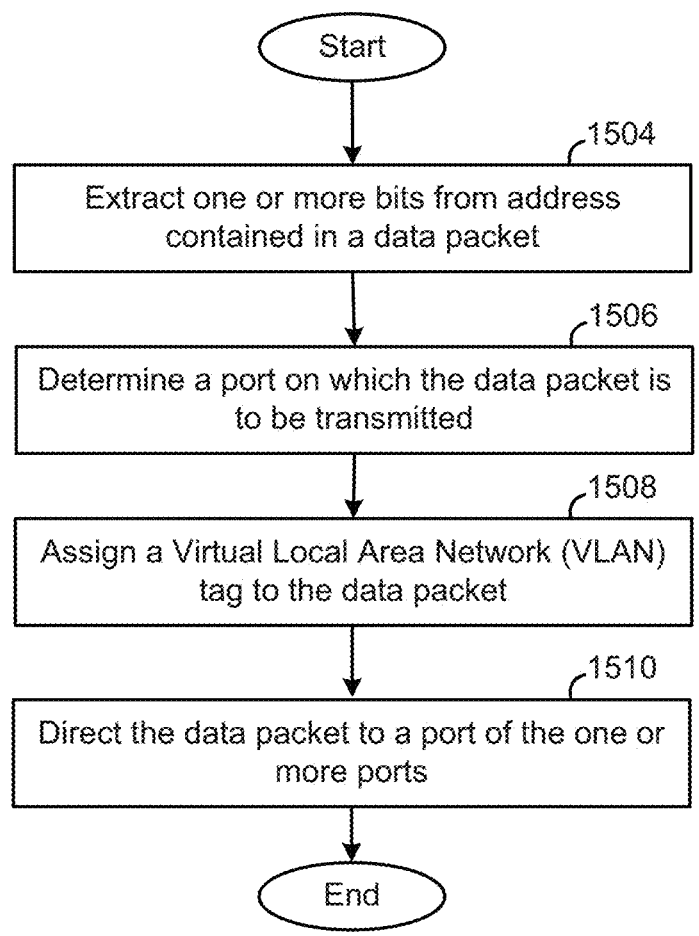
FIG. 15 is a flow diagram illustrating a method for forwarding a data packet to a firewall security device in accordance with an embodiment of the present invention.

FIG. 15 is a flow diagram illustrating a method for forwarding a data packet to a firewall security device in accordance with an embodiment of the present invention.

After the reception of a data packet by the switching device, at block 1504, one or more bits from at least one of a source address and a destination address contained in the data packet are extracted. For example if the administrator has configured the hash bit value as five and elected to perform load balancing based on the destination address, then five bits from the destination address are extracted.

At block 1506, a port on which a data packet is to be transmitted is determined. The determination is based on the value of an outcome calculated based on the configured rule and the load balancing table. Further, the load balancing table and the generation of the one or more outcomes based on the configured rule are explained in conjunction with FIG. 3, FIG. 12, and FIG. 14.

At block 1508, a VLAN tag is assigned to the data packet. In an embodiment of the present invention, the data packet, when received at the switching device, is already VLAN tagged. A second VLAN tag is assigned at the switching device.

At block 1510, the data packet is directed to the port determined at step 1506 based on the address contained in the data packet and the load balancing table.

Figure 16:
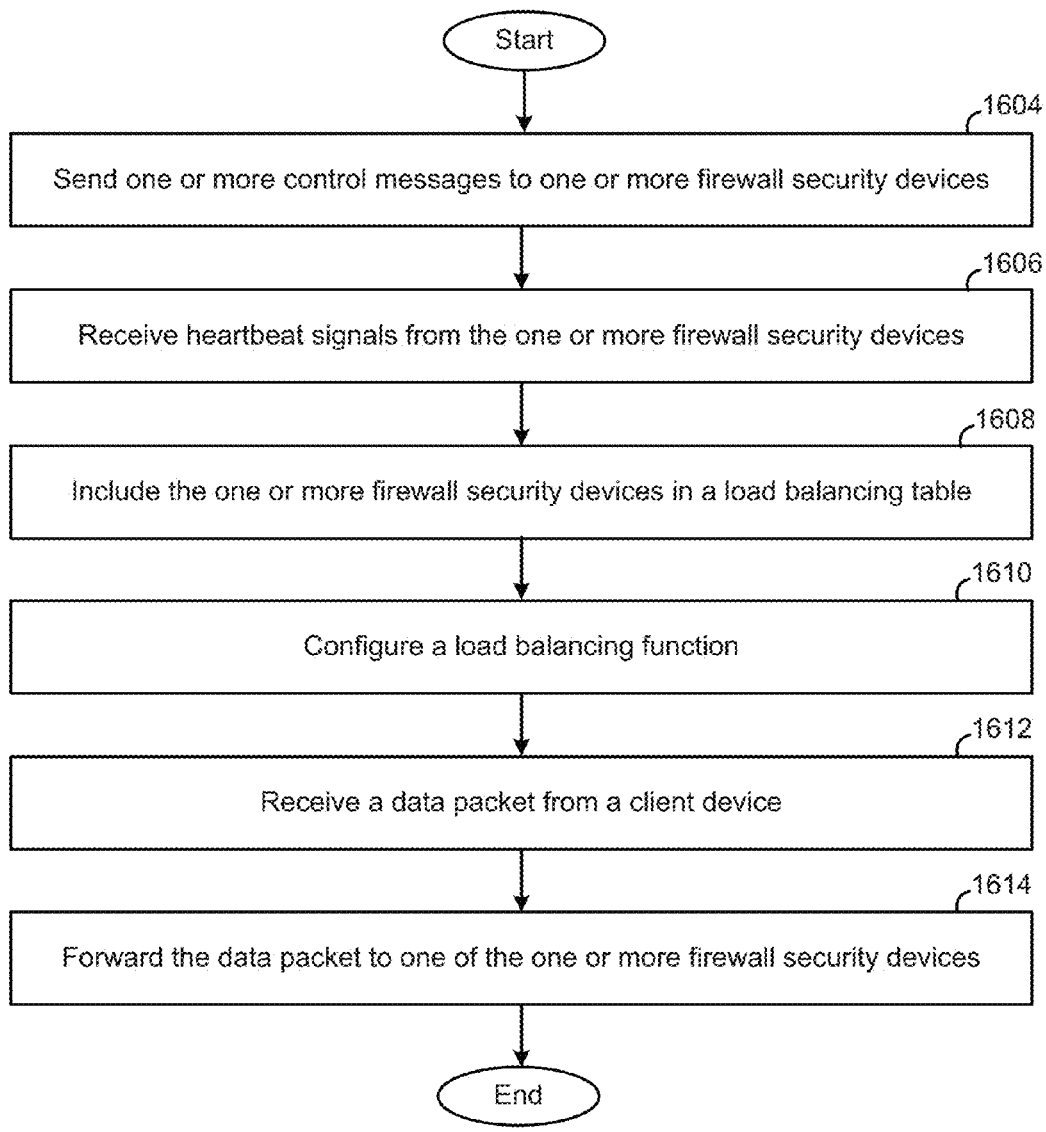
FIG. 16 is a flow diagram illustrating a method for balancing load among one or more firewall security devices in accordance with an embodiment of the present invention.

FIG. 16 is a flow diagram illustrating a method for balancing load among one or more firewall security devices in accordance with an embodiment of the present invention.

Blocks 1604, 1606, and 1608 illustrate the steps of configuring a switching device, such as switching device 106, with one or more firewall security devices, such as one or more firewall security devices 208.

At block 1604, one or more control messages are sent to the one or more firewall security devices by a switching device. In response to the reception of such control messages the firewall security device synchronizes its operation with other firewall security devices in a cluster. In an embodiment of the present invention, multiple synchronization messages are exchanged between the firewall security device and other firewall security devices in a cluster.

At block 1606, heartbeat signals are received from the firewall security device. As discussed in conjunction with FIG. 2 and FIG. 13, the heartbeat signals consists of hello packets that are sent by the firewall security device at regular intervals to the switching device. These hello packets describe the state of the firewall security device and are also used by other cluster units to keep all cluster units synchronized.

After the successful configuration of the firewall security device, at block 1608, the configured firewall security device is included in a load balancing table, such as the load balancing table 318, as discussed in conjunction with FIG. 3 and FIG. 4.

At block 1610, a load balancing function is configured in order to distribute the data packets among the one or more ports. As a result of the configuration of the load balancing function, the load balancing table is updated. Further, the configuration of the load balancing function has been discussed in detail in conjunction with FIG. 14.

At block 1612, a data packet is received at the switching device that needs to be forwarded to one of the firewall security device in the cluster. The data packet may represent a request for accessing information from one or more computer systems, such as, one or more computer systems 114 form an internal network, such as, network 112. Various examples of the data packet type are IPv4, IPv6, non-IP and so forth. It will be apparent to the person ordinarily skilled in the art that the invention is not limited with respect to the type of data packet. Further, an exemplary IPv4 data packet is explained in an exemplary embodiment of the present invention, in conjunction with FIG. 3.

Further, after the reception of the data packet, one or more bits from at least one of the source address and the destination address are extracted. For example if the administrator has configured hash bit value as Five and elected to perform load balancing based on the destination address, then Five bits from the destination address are extracted. Notably, the bits need not be adjacent or consecutive. Further, it will be apparent to a person ordinarily skilled in the art that any combination of bits can be selected by the administrator without limiting the scope of the invention and without deviating from the scope of the invention.

At block 1614, the data packet is forwarded to one of the firewall security devices based on the extracted address, the load balancing function and load balancing table.

Methods and systems, according to various embodiments of the present invention, provide high availability (HA) clusters of firewall security devices for load balancing in a network. An HA cluster provides enhanced reliability and increased performance, the two key requirements of critical enterprise networking. Load balancing in HA is implemented by configuring a plurality of firewall security devices in HA cluster. In the network, HA clusters process network traffic and provide normal security services such as firewalling, virtual private network (VPN), virus scanning, web filtering, and spam filtering services.

In an embodiment of the present invention, the switching device implements direct control of spanning-tree state of interfaces as a rapid HA mechanism. For example, depending upon the characteristics of the particular switch, the spanning-tree protocol (STP) hardware built into the switch may be used as a means of blocking ports as the STP block is a very low level disabling of traffic forwarding on the port, but does not affect the physical behavior of the link. Those of ordinary skill in the art will appreciate other port blocking approaches may be utilized.

According to an embodiment of the present invention, if a firewall security device in a cluster fails, the other firewall security device in the cluster automatically takes over the work that the failed firewall security was performing. Thus, the cluster continues to process network traffic and provide normal security services with virtually no interruption. Further, according to various embodiments of the present invention, methods and systems for load balancing among the plurality of firewall security devices is capable of achieving extreme levels of session-based performance. Furthermore, the various embodiments of the present invention offer the advantage of geographically distributed load-balancing, since the invention can be used to overcome a number of firewall deployment limitations, including handling asynchronous traffic.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method of adaptive load balancing among a plurality of cluster units of a high availability (HA) cluster of firewall security devices installed within an advanced telecommunications computing architecture (ATCA) chassis and associated with a private Internet Protocol (IP) network, the method comprising:

configuring, by a network switching device installed within a hub/switch fabric slot of the ATCA chassis, a load balancing function implemented by the network switching device based on information received from a network administrator indicative of (i) a number of bits to be used as an input to the load balancing function and (ii) corresponding contiguous or non-contiguous bit positions within a header of a packet;

maintaining, by the network switching device, a load balancing table that forms associations between hash values or emulated hash values output by the load balancing function and corresponding ports of a plurality of ports of the network switching device to which the plurality of cluster units are coupled;

directing network traffic received by the network switching device to appropriate cluster units of the plurality of cluster units by:
 determining a hash value or an emulated hash value by applying the load balancing function to values associated with the bit positions of the number of bits within headers of packets of the network traffic;
 identifying a port of the plurality of ports to which an appropriate cluster unit of the plurality of cluster units is coupled based on the determined hash value or the determined emulated hash value and the load balancing table; and
 passing the network traffic to the appropriate cluster unit via the identified port;

monitoring, by the network switch device, a traffic load on each of the plurality of cluster units; and responsive to a deviation of the monitored traffic loads from a predefined ideal traffic distribution, attempting, by the network switching device, to improve performance of the HA cluster by dynamically adjusting the load balancing table to address the deviation.

2. The method of claim 1, further comprising:

determining, by the network switching device, the monitored traffic load for a first cluster unit of the plurality of cluster units, coupled to a first port of the plurality of ports, is greater than the monitored traffic load for a second cluster unit of the plurality of cluster units, coupled to a second port of the plurality of ports; and causing subsequently received network traffic associated with a subset of traffic sessions for which security services are currently being performed by the first cluster unit to be performed by the second cluster unit, by, the network switching device, updating the load balancing table to replace a reference to the first port with a reference to the second port for at least one of the associations between one or more of the hash values or emulated hash values and the first port.

3. The method of claim 2, wherein the security services include one or more of firewalling, virtual private networking (VPN), intrusion prevention system (IPS) scanning, virus scanning, web filtering and spam filtering.

4. The method of claim 1, further comprising prior to said updating, causing, by the network switching device, session information associated with the subset of traffic sessions to be copied from the first cluster unit to the second cluster unit by performing targeted session synchronization between the first cluster unit and the second cluster unit.

5. The method of claim 1, wherein the load balancing function is based on a portion, but not an entirety, of an IP or media access control (MAC) destination address specified within the headers of the packets.

6. The method of claim 5, wherein the load balancing function is expressed in a form substantially as follows:

$$f(x)=D_N*2^N+D_{N-1}*2^{N-1}+\ldots+D_2*2^2+D_1*2^1+D_0*2^0;$$

where $D_N$ represents a value of a particular bit position of the IP destination address; and where N represents the number of bits minus 1.

7. The method of claim 1, wherein the packets comprise IP version 4 packets and wherein the corresponding contiguous or non-contiguous bit positions are within one or more of a type of service field, a protocol field, a source port field, a destination port field, a source address field and a destination address field of the headers.

8. The method of claim 1, wherein the load balancing table is implemented within a content addressable memory (CAM) and wherein said identifying a port of the plurality of ports comprises providing the determined hash value or the determined emulated hash value to the CAM as an input and receiving from the CAM responsive thereto a port number.

9. The method of claim 1, wherein the load balancing table is implemented within a random access memory (RAM) and wherein said identifying a port of the plurality of ports comprises searching the load balancing table for a table entry having a hash value or an emulated hash value matching the determined hash value or the determined emulated hash value and extracting therefrom a port number.

10. A non-transitory computer-readable storage medium readable by one or more processors of a network switching device installed within a hub/switching slot of an advanced telecommunications computing architecture (ATCA) chassis associated with a private Internet Protocol (IP) network and coupled to a plurality of cluster units of a high availability (HA) cluster of firewall security devices installed within the ATCA chassis, the computer-readable storage medium embodying a set of instructions executable by the one or more processors to perform a method of adaptive load balancing among the plurality of cluster units, the method comprising:
    configuring a load balancing function implemented by the network switching device based on information received from a network administrator indicative of (i) a number of bits to be used as an input to the load balancing function and (ii) corresponding contiguous or non-contiguous bit positions within a header of a packet;
    maintaining a load balancing table that forms associations between hash values or emulated hash values output by the load balancing function and corresponding ports of a plurality of ports of the network switching device to which the plurality of cluster units are coupled;
    directing network traffic received by the network switching device to appropriate cluster units of the plurality of cluster units by:
        determining a hash value or an emulated hash value by applying the load balancing function to values associated with the bit positions of the number of bits within headers of packets of the network traffic;
        identifying a port of the plurality of ports to which an appropriate cluster unit of the plurality of cluster units is coupled based on the determined hash value or the determined emulated hash value and the load balancing table; and
        passing the network traffic to the appropriate cluster unit via the identified port;
    monitoring a traffic load on each of the plurality of cluster units; and
    responsive to a deviation of the monitored traffic loads from a predefined ideal traffic distribution, attempting to improve performance of the HA cluster by dynamically adjusting the load balancing table to address the deviation.

11. The non-transitory computer-readable storage medium of claim 10, wherein the method further comprises:
    determining the monitored traffic load for a first cluster unit of the plurality of cluster units, coupled to a first port of the plurality of ports, is greater than the monitored traffic load for a second cluster unit of the plurality of cluster units, coupled to a second port of the plurality of ports; and
    causing subsequently received network traffic associated with a subset of traffic sessions for which security services are currently being performed by the first cluster unit to be performed by the second cluster unit, by updating the load balancing table to replace a reference to the first port with a reference to the second port for at least one of the associations between one or more of the hash values or emulated hash values and the first port.

12. The non-transitory computer-readable storage medium of claim 11, wherein the security services include one or more of firewalling, virtual private networking (VPN), intrusion prevention system (IPS) scanning, virus scanning, web filtering and spam filtering.

13. The non-transitory computer-readable storage medium of claim 10, wherein the method further comprises prior to said updating, causing session information associated with the subset of traffic sessions to be copied from the first cluster unit to the second cluster unit by performing targeted session synchronization between the first cluster unit and the second cluster unit.

14. The non-transitory computer-readable storage medium of claim 10, wherein the load balancing function is based on a portion, but not an entirety, of an IP or media access control (MAC) destination address specified within the headers of the packets.

15. The non-transitory computer-readable storage medium of claim 14, wherein the load balancing function is expressed in a form substantially as follows:

$$f(x)=D_N*2^N+D_{N-1}*2^{N-1}+\ldots+D_2*2^2+D_1*2^1+D_0*2^0;$$

where $D_N$ represents a value of a particular bit position of the IP destination address; and where N represents the number of bits minus 1.

16. The non-transitory computer-readable storage medium of claim 10, wherein the packets comprise IP version 4 packets and wherein the corresponding contiguous or non-contiguous bit positions are within one or more of a type of service field, a protocol field, a source port field, a destination port field, a source address field and a destination address field of the headers.

17. The non-transitory computer-readable storage medium of claim 10, wherein the load balancing table is implemented within a content addressable memory (CAM) and wherein said identifying a port of the plurality of ports comprises providing the determined hash value or the determined emulated hash value to the CAM as an input and receiving from the CAM responsive thereto a port number.

18. The non-transitory computer-readable storage medium of claim 10, wherein the load balancing table is implemented within a random access memory (RAM) and wherein said identifying a port of the plurality of ports comprises searching the load balancing table for a table entry having a hash value or an emulated hash value matching the determined hash value or the determined emulated hash value and extracting therefrom a port number.

* * * * *